United States Patent
Tan et al.

(10) Patent No.: US 11,577,448 B1
(45) Date of Patent: *Feb. 14, 2023

(54) METHOD FOR FABRICATING MULTIPHENYLETHYNYL-CONTAINING AND LIGHTLY CROSSLINKED POLYIMIDES CAPABLE OF MEMORIZING SHAPES AND AUGMENTING THERMOMECHANICAL STABILITY

(71) Applicant: Government of the United States, as represented by the Secretary of the Air Force, Wright-Patterson AFB, OH (US)

(72) Inventors: Loon-Seng Tan, Centerville, OH (US); David H. Wang, Beavercreek, OH (US); Zhenning Yu, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 398 days.

This patent is subject to a terminal disclaimer.

(21) Appl. No.: 16/752,747

(22) Filed: Jan. 27, 2020

Related U.S. Application Data

(60) Provisional application No. 62/908,211, filed on Sep. 30, 2019.

(51) Int. Cl.
  *B29C 53/00* (2006.01)
  *C08G 73/10* (2006.01)
  (Continued)

(52) U.S. Cl.
  CPC ............ *B29C 53/005* (2013.01); *B29C 35/02* (2013.01); *B29C 41/003* (2013.01); *B29C 41/02* (2013.01);
  (Continued)

(58) Field of Classification Search
  CPC .................. C08G 2280/00; C08L 2201/12
  See application file for complete search history.

(56) References Cited

U.S. PATENT DOCUMENTS

| | | | | |
|---|---|---|---|---|
| 5,567,800 | A | * | 10/1996 | Hergenrother .......... C07C 65/28 528/229 |
| 7,582,722 | B1 | * | 9/2009 | Tan ...................... C08G 73/101 528/423 |

(Continued)

OTHER PUBLICATIONS

Connell, J. W.; Smith, J. G., Jr.; Hergenrother, P. M.: Oligomers and polymers containing phenylethynyl groups. Journal of Macromolecular Science, Reviews in Macromolecular Chemistry and Physics 2000, C40, 207-230.

(Continued)

*Primary Examiner* — Benjamin A Schiffman
(74) *Attorney, Agent, or Firm* — AFMCLO/JAZ; James F. McBride

(57) ABSTRACT

The invention generally relates to shape memory films that are tri-functionally crosslinked and that comprise multiple, non-terminal, phenylethynyl moieties. In addition, the present invention relates methods of fabricating such films. Due to the improved properties of such SMPs, the SMP designer can program in to the SMP thermomechanical property enhancements that make the SMP suitable, among other things, for advanced sensors, high temperature actuators, responder matrix materials and heat responsive packaging.

15 Claims, 10 Drawing Sheets

(A)

(B)

(51) Int. Cl.
  *B29C 41/46* (2006.01)
  *C08G 73/14* (2006.01)
  *B29C 41/12* (2006.01)
  *B29C 41/42* (2006.01)
  *B29C 35/02* (2006.01)
  *B29C 41/02* (2006.01)
  *B29C 41/00* (2006.01)
  *B29C 53/04* (2006.01)
  *C08G 73/12* (2006.01)
  *C08J 5/02* (2006.01)
  *B29K 105/00* (2006.01)
  *B29K 105/24* (2006.01)
  *B29K 79/00* (2006.01)

(52) U.S. Cl.
  CPC ............. *B29C 41/12* (2013.01); *B29C 41/42* (2013.01); *B29C 41/46* (2013.01); *B29C 53/04* (2013.01); *C08G 73/101* (2013.01); *C08G 73/1067* (2013.01); *C08G 73/1071* (2013.01); *C08G 73/121* (2013.01); *C08G 73/124* (2013.01); *C08G 73/14* (2013.01); *C08J 5/02* (2013.01); *B29C 2791/001* (2013.01); *B29C 2791/004* (2013.01); *B29K 2079/08* (2013.01); *B29K 2105/0061* (2013.01); *B29K 2105/24* (2013.01); *B29K 2995/0094* (2013.01); *C08G 73/127* (2013.01); *C08G 2220/00* (2013.01); *C08G 2280/00* (2013.01); *C08J 2379/08* (2013.01); *C08L 2201/12* (2013.01)

(56) References Cited

U.S. PATENT DOCUMENTS

| | | | |
|---|---|---|---|
| 7,678,873 B1 * | 3/2010 | Tan | C08G 73/1046 528/128 |
| 8,102,753 B2 * | 1/2012 | Duerig | G11B 9/1454 369/127 |
| 8,129,496 B2 * | 3/2012 | Duerig | G11B 11/007 528/125 |
| 8,502,401 B2 * | 8/2013 | Burgoyne, Jr. | C08L 71/00 528/125 |
| 8,546,614 B1 | 10/2013 | Tan et al. | |
| 8,668,981 B2 | 3/2014 | Karst et al. | |
| 8,791,227 B1 | 7/2014 | Tan et al. | |
| 8,815,999 B2 * | 8/2014 | Rosenberg | C08G 73/1085 549/429 |
| 8,962,890 B1 | 2/2015 | Tan et al. | |
| 10,239,254 B1 | 3/2019 | Tan et al. | |
| 10,294,255 B1 | 5/2019 | Tan et al. | |
| 10,988,437 B1 * | 4/2021 | Tan | C08G 73/1025 |
| 2015/0284498 A1 | 10/2015 | Weiss et al. | |
| 2016/0369055 A1 | 12/2016 | Leng et al. | |
| 2020/0172667 A1 * | 6/2020 | Das | C08G 65/485 |

OTHER PUBLICATIONS

Smith, J. G., Jr.; Connell, J. W.: Chemistry and properties of imide oligomers from phenylethynyl-containing diamines. High Performance Polymers 2000, 12, 213-223.

Bai, Y.; Mao, L.; Liu, Y.: High temperature shape memory polyimide ionomer. Journal of Applied Polymer Science 2016, 133, DOI: 10.1002/APP.43630.

Kong, D.; Xiao, X.: High Cycle-life Shape Memory Polymer at High Temperature. Scientific Reports 2016, 6, 33610pp.

Xiao, X.; Qiu, X.; Kong, D.; Zhang, W.; Liu, Y.; Leng, J.: Optically transparent high temperature shape memory polymers. Soft Matter 2016, 12, 2894-2900.

Wang, Q.; Bai, Y.; Chen, Y.; Ju, J.; Zheng, F.; Wang, T.: High performance shape memory polyimides based on π-π interactions. Journal of Materials Chemistry A: Materials for Energy and Sustainability 2015, 3, 352-359.

Xiao, X.; Kong, D.; Qiu, X.; Zhang, W.; Zhang, F.; Liu, L.; Liu, Y.; Zhang, S.; Hu, Y.; Leng, J.: Shape-Memory Polymers with Adjustable High Glass Transition Temperatures. Macromolecules (Washington, DC, United States) 2015, 48, 3582-3589.

Koerner, H.; Strong, R. J.; Smith, M. L.; Wang, D. H.; Tan, L.-S.; Lee, K. M.; White, T. J.; Vaia, R. A.: Polymer design for high temperature shape memory: Low crosslink density polyimides. Polymer 2013, 54, 391-402.

Yoonessi, M.; Shi, Y.; Scheiman, D. A.; Lebron-Colon, M.; Tigelaar, D. M.; Weiss, R. A.; Meador, M. A.: Graphene Polyimide Nanocomposites; Thermal, Mechanical, and High-Temperature Shape Memory Effects. ACS Nano 2012, 6, 7644-7655.

* cited by examiner

METHOD FOR FABRICATING MULTIPHENYLETHYNYL-CONTAINING AND LIGHTLY CROSSLINKED POLYIMIDES CAPABLE OF MEMORIZING SHAPES AND AUGMENTING THERMOMECHANICAL STABILITY

CROSS-REFERENCE TO RELATED APPLICATION

The present application claims priority to U.S. Provisional Application Ser. No. 62/908,211 filed Sep. 30, 2019, the contents of which is hereby incorporated by reference in its entry.

RIGHTS OF THE GOVERNMENT

The invention described herein may be manufactured and used by or for the Government of the United States for all governmental purposes without the payment of any royalty.

FIELD OF THE INVENTION

The invention generally relates to shape memory polymers that are tri-functionally crosslinked and that comprise non-terminal, multiple phenylethynyl moieties. In addition, the present invention relates methods of fabricating such polymers.

BACKGROUND OF THE INVENTION

Shape memory polymers (SMPs) are a class of active materials that can be programmed to "fix" a temporary shape or a series of temporary shapes, and then later to recover to a "memorized" permanent shape established by a covalent or physical network by applying an environmental stimulus, for example, heat to the SMP. Unfortunately current SMPs are not suitable for all applications as they do not offer the desired level and combination of sustainable, high temperature mechanical properties needed for current applications. Applicants recognized that the source of the aforementioned problems was that the current SMPs were not self-thermosetting. Applicants discovered that such problems could be effectively solved by adding the combination of tri-functional crosslinking and multiple non-terminal, phenylethynyl moieties to certain SMPs. While not being bound by theory, Applicants believe that the tri-functional crosslinking adds shape memory and multiple non-terminal, phenylethynyl moieties have a lower reactivity barrier when compared to SMPs comprising single non-terminal, phenylethynyl moieties and do to the proximity effect of the multiple non-terminal, phenylethynyl moieties the non-terminal, phenylethynyl moieties can react with each other on the same polymer chain to form radicals that provide multiple crosslinking pathways for said polymer chain. Furthermore, when crosslinked, the SMP's modulus of elasticity is increased and due to the latent crosslinking that can be programmed into the SMP by the molecular designer sustainable, mechanical property enhancements can be realized. As a result, Applicants disclose herein, SMPs that are suitable, among other things, for advanced sensors, responder applications and heat responsive packaging.

SUMMARY OF THE INVENTION

The invention generally relates to shape memory films that are tri-functionally crosslinked and that comprise multiple, non-terminal, phenylethynyl moieties. In addition, the present invention relates methods of fabricating such films. Due to the improved properties of such SMPs, the SMP designer can program into the SMP mechanical property enhancements that make the SMP suitable, among other things, for advanced sensors, high temperature actuators, responder matrix materials and heat responsive packaging.

BRIEF DESCRIPTION OF THE DRAWINGS

The accompanying drawings, which are incorporated in and constitute a part of this specification, illustrate embodiments of the invention and, together with the summary given above, and the detailed description given below, serve to explain the invention.

DETAILED DESCRIPTION OF THE INVENTION

Definitions

Figure 1A:
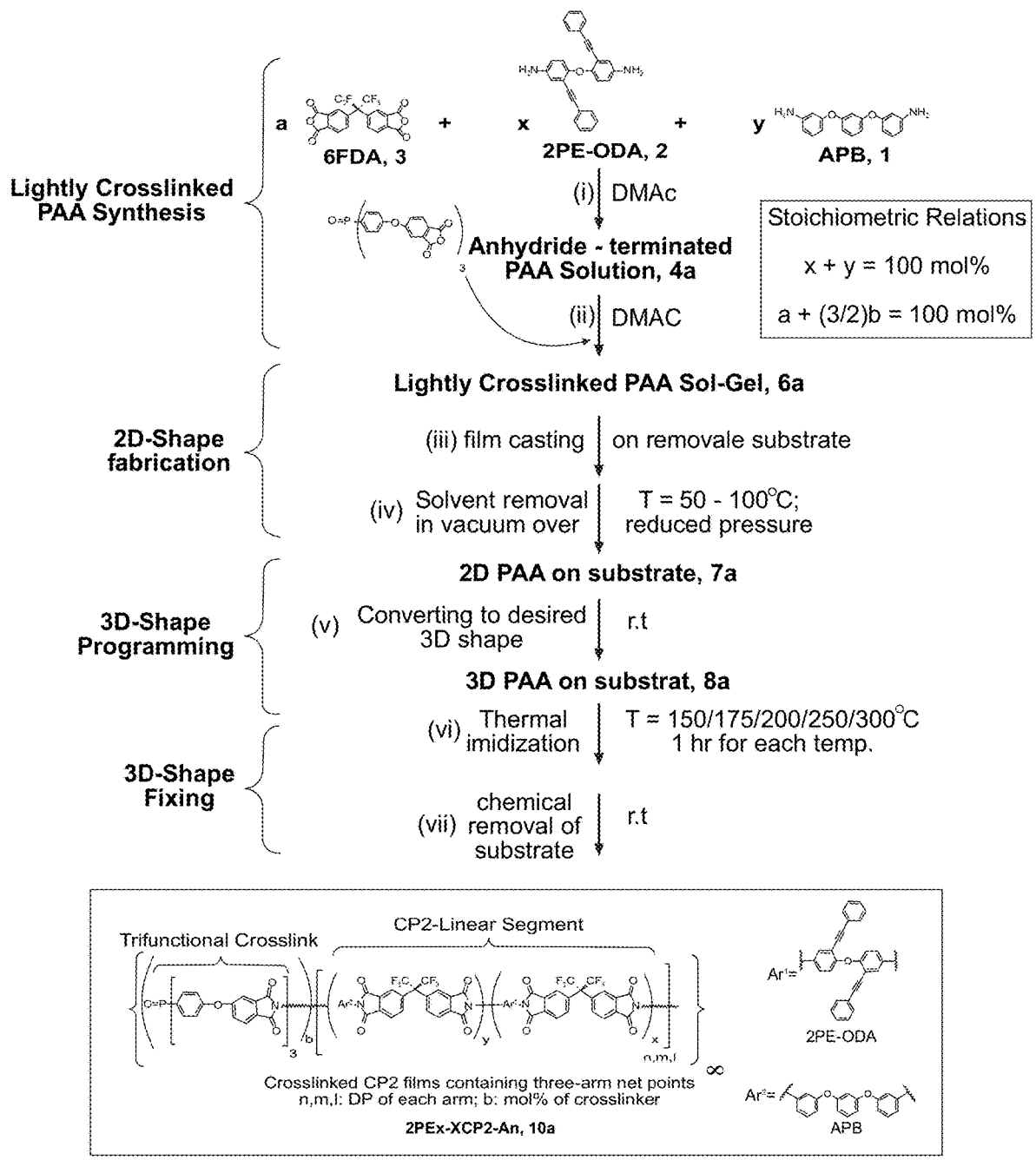
FIG. 1A is an exemplary scheme depicts the integrated process that combines the synthesis of lightly crosslinked polyamic acid (PAA), steps (i)-(ii), and fabrication of 3D object comprised of crosslinked polyimide (3D-XPI): 2D (film) and 3D fabrication, steps (iii)-(iv) and steps (v)-(vi), respectively, and removal of supporting substrate, step (vii). This example pertains to generation of amine-terminated PAA that reacts fully with stoichiometric amount of a trianhydride crosslinker (POTAn). The idealized structure of crosslinked polyimides, designated as 2PEx-XCP2-Anb where "x=mol % of 2PE-ODA", X denotes crosslinked and "b=mol % of phosphine-oxide trianhydride", is shown in the box.

Unless specifically stated otherwise, as used herein, the terms "a", "an" and "the" mean "at least one".

As used herein, the terms "include", "includes" and "including" are meant to be non-limiting.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Method of Fabricating a Shape Memory Polymer

For purposes of this specification, headings are not considered paragraphs and thus this paragraph is Paragraph 0023 of the present specification. The individual number of each paragraph above and below this paragraph can be determined by reference to this paragraph's number. In this paragraph 0023, Applicants disclose method for fabricating a shape memory polymer into a three-dimensional object, comprising:

a) treating a solution comprising:
(i) a polymeric intermediate comprising repeat units and non-terminal, phenylethynyl moieties, each of said repeat units independently comprising 0 to 4 of said non-terminal, phenylethynyl moieties per repeat unit with the proviso that not all of said repeat units comprise only 0 or only 1 of said non-terminal, phenylethynyl moieties, preferably each of said repeat units independently comprising 0 to 3 of said non-terminal, phenylethynyl moieties per repeat unit with the proviso that not all of said repeat units comprise only 0 or only 1 of said non-terminal, phenylethynyl moieties, more preferably each of said repeat units independently comprising 0 to 2 of said non-terminal, phenylethynyl moieties per repeat unit with the proviso that no more than about 40%, more preferably no more than about 50% of said repeat units comprise 0 of said non-terminal, phenylethynyl moieties per repeat unit; most preferably each of said repeat units independently comprising 0 to 2 of said non-terminal, phenylethynyl moieties per repeat unit with the proviso that no more than about 40%, more preferably no more than about 50% of said repeat units comprise 0 of said non-terminal, phenylethynyl moieties per repeat unit and the remaining repeat units comprise solely 1 or 2 of said non-terminal, phenylethynyl moieties, said polymeric intermediate being selected from the group consisting of a poly (amic acid) intermediate, said poly(amic acid) intermediate can be a reaction product of an aromatic diamine monomer and a dianhydride-containing monomer either said aromatic diamine monomer or said dianhydride-containing monomer comprising a phenylethynyl moiety); a poly(amide-amic acid) intermediate, said poly(amide-amic acid) can be a reaction product of an aromatic diamine monomer and a (anhydride-acid chloride) containing monomer, either said aromatic diamine monomer or said (anhydride-acid chloride) containing monomer comprising a phenylethynyl moiety); a copolymer intermediate of poly(amic acid) and poly(amide-amic acid) and mixtures thereof, said copolymer intermediate of poly(amic acid) and poly(amide-amic acid) (said poly(amic acid) can be a reaction product of an aromatic diamine monomer and a dianhydride-containing monomer either said aromatic diamine monomer or said dianhydride-containing monomer comprising a phenylethynyl moiety and said poly(amide-amic acid) being a reaction product of an aromatic diamine monomer and an (anhydride-acid chloride) containing monomer, either said aromatic diamine monomer or said (anhydride-acid chloride) containing monomer comprising a phenylethynyl moiety), preferably said polymeric intermediate is terminally anhydride functionalized or amine functionalized;

(ii) a solvent, preferably a polar aprotic solvent, more preferably N,N-dimethylformamide (DMF), N,N-dimethylacetamide (DMAc), and/or N-methylpyrrolidone (NMP)

with a multi-functional crosslinking agent to thereby form a sol-gel comprising a crosslinked poly(amic acid), a crosslinked poly(amide-amic acid) and/or a crosslinked copolymer of poly(amic acid) and poly(amide-amic acid), said crosslinked poly(amic acid), a crosslinked poly(amide-amic acid) and/or a crosslinked copolymer of poly(amic acid) and poly(amide-amic acid) comprising said non-terminal, phenylethynyl moieties, said multi-functional crosslinking agent comprising at least a tri-functionalized amine crosslinking agent when said polymeric intermediate is anhydride end-functionalized and said multi-functional crosslinking agent comprising at least a tri-functionalized anhydride crosslinking agent when said polymeric intermediate is amine end-functionalized, preferably said crosslinking agent being selected from the group consisting of a phosphine-oxide triamine or a phosphine-oxide trianhydride;

b) forming a film of said sol-gel on a substrate to provide a laminated substrate;

c) evaporating at least a portion of the solvent from the sol-gel by heating the sol-gel comprising to a temperature in a range of about 50° C. to about 100° C. at a pressure less than about atmospheric pressure;

d) forming the laminated substrate into a first configuration that is in a three-dimensional form;

e) imidizing, via heating, said sol-gel to provide the shape memory polymer having a permanent shape corresponding to the first configuration, wherein the shape memory polymer comprises a crosslinked polyimide, a crosslinked poly(amide-imide) and/or a crosslinked polyimide poly(amide-imide) copolymer; and f) removing the substrate from the laminated substrate to provide the three-dimensional object comprising the shape memory polymer, preferably said removal comprises chemically removing the substrate from the laminated substrate g) optionally, heating said shape memory polymer to a temperature of from about 210° C. to 250° C. and then placing said shape memory polymer under tension to a new shape, preferably a two dimensional object and the freezing said shape memory polymer.

Applicants disclose a method for fabricating a shape memory polymer into a three-dimensional object according to Paragraph 0023 comprising crosslinking said non-terminal, phenylethynyl moieties by heating said substrate to a temperature of from greater than 250° C. to about 400° C., preferably 290° C. to about 325° C., more preferably from about 295° C. to about 305° C., preferably said temperature is maintained for about from 1 hour to about 72 hours. In one aspect, said imidizing comprises heating said crosslinked poly(amic acid) to temperatures of about 150° C., about 175° C., about 200° C., and/or about 250° C., and maintaining each of said temperatures for about one hour. With this step, the shape memory polymer self-folds into a three-dimensional object if it is supplied in non-three dimensional form at approximately 25° C. If the shape memory polymer is supplied in a three dimensional form at approximately 25° C. the three dimensional shape is locked in and the modulus of elasticity will increase.

Applicants disclose a method according to Paragraphs 0023 through 0024 wherein the substrate comprises a metal that dissolves in an aqueous acid solution, preferably said metal comprises aluminum.

Applicants disclose a method according to Paragraphs 0023 through 0025 wherein the multi-functional anhydride crosslinking agent has the following chemical formula:

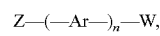

wherein Z represents an anhydride functional group that is directly or indirectly bonded to Ar; Ar represents an aryl group that is directly bonded to W; and n is equal to 3 when W is P=O or N, or n is equal to 4 when W is Si or a carbon moiety.

Applicants disclose a method according to Paragraph 0026 wherein Ar is a phenyleneoxy group (—OPh-) that is para- or meta-substituted with respect to oxygen, and the multi-functional anhydride crosslinking agent has the following chemical formula:

Applicants disclose a method according to Paragraph 0026 wherein Z and Ar in combination form a phthalic anhydride moiety that is directly bonded to W.

Applicants disclose a method according to Paragraph 0026 wherein Ar is a phenyleneoxy group (—OPh-) that is para- or meta-substituted with respect to oxygen, and wherein Z is a phthalic anhydride group that is connected to the phenyleneoxy group through an ether bond.

Applicants disclose a method according to Paragraph 0026 wherein W is P=O, wherein Ar is a phenyleneoxy group (—OPh-) that is para- or meta-substituted with respect to oxygen, and wherein the multi-functional anhydride crosslinking agent has the following chemical formula:

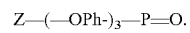

Applicants disclose a method according to Paragraph 0030 wherein Z is a phthalic anhydride group that is connected to the phenyleneoxy group through an ether bond, and wherein the multi-functional anhydride crosslinking agent has the following chemical formula:

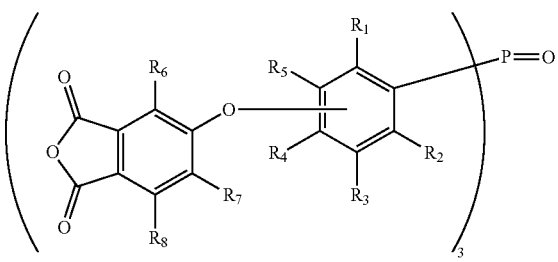

wherein $R_1$ through $R_8$ are each independently selected from H or $C_1$-$C_4$ alkyl.

Applicants disclose a method according to Paragraph 0031 wherein the multi-functional anhydride crosslinking agent is selected from tris[3-(3,4-dicarboxyphenoxy)phenyl]phosphine oxide trianhydride or tris[4-(3,4-dicarboxyphenoxy)phenyl]phosphine oxide trianhydride.

Applicants disclose a method according to Paragraph 0026 wherein W is N, wherein Ar is a phenyleneoxy group (—OPh-) that is para- or meta-substituted with respect to oxygen, and wherein the multi-functional anhydride crosslinking agent has the following chemical formula:

Z—(—OPh-)$_3$—N.

Applicants disclose a method according to Paragraph 0033 wherein Z is a phthalic anhydride group that is connected to the phenyleneoxy group through an ether bond, and wherein the multi-functional anhydride crosslinking agent has the following chemical formula:

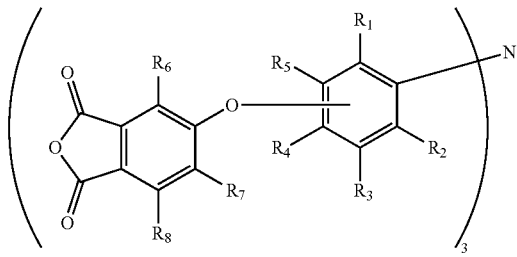

wherein $R_1$ through $R_8$ are each independently selected from H or $C_1$-$C_4$ alkyl.

Applicants disclose a method according to Paragraph 0032 wherein the multi-functional anhydride crosslinking agent is selected from tris[3-(3,4-dicarboxyphenoxy)phenyl]amine trianhydride or tris[4-(3,4-dicarboxyphenoxy)phenyl]amine trianhydride.

Applicants disclose a method according to Paragraph 0026 wherein W is N, wherein Z and Ar in combination form a phthalic anhydride moiety that is directly bonded to N, and wherein the multi-functional anhydride crosslinking agent has the following chemical formula:

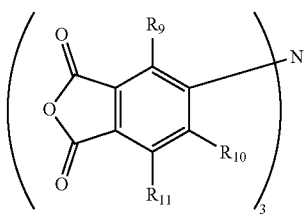

wherein $R_9$ to $R_{11}$ are each independently selected from H or $C_1$-$C_4$ alkyl.

Applicants disclose a method according to Paragraphs 0023 through 0024 wherein the multi-functional amine crosslinking agent comprises a tri(oxybenzene-amine) crosslinker having following chemical formula:

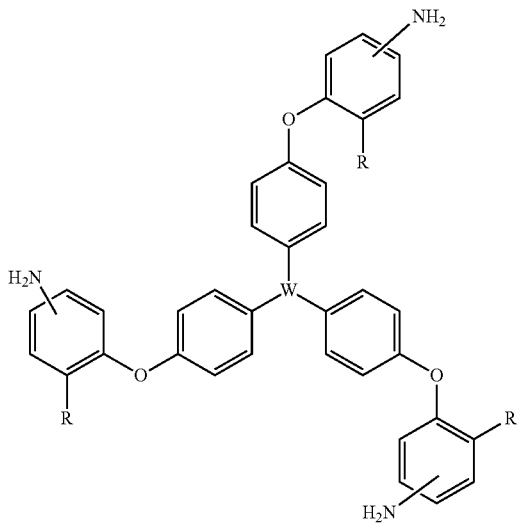

wherein W is selected from a group consisting of $CH_3C$, N, P=O, or $BO_3$; R is selected from a group consisting of H, F, Cl, $CF_3$, or $CH_3$; and the amine groups are located meta or para with respect to R.

The formation of the laminated substrate may be based on origami techniques. As commonly known, origami is a Japanese art based on folding paper, but in recent years, the concept has been advanced beyond artistic creations and toys such that three-dimensional, complex objects now can be designed to be capable of on-command transformation into a wide range of devices and robotic systems. Easily taken for granted examples to illustrate the utility of origami concept can be found in foldable maps, shopping bags, storage boxes and cartons, etc. More advanced examples such as automobile airbags, shock absorbers, 3D and light-trapping photovoltaics, and biomedical devices/implants such as stent further illustrate the ingenious application of origami engineering concept. In general, origami concept is best used to solve technological problems that require solutions to (i) small-volume packaging for (ii) efficient storage and (iii) transportation, (iv) easy deployment, and in some cases (v) reusability. The most attractive features of origami concept are (i) it is scale-free, applicable from nanoscale level (protein folding and DNA origami) to kilometer-scale (solar panels) and (ii) applicable to various printing techniques.

Fundamentally, origami can be considered as a process that involves a sequence of folding steps (i.e. programmed fold or crease pattern) to eventually transform a 2-D substrate to the designed 3-D object. Therefore, important to 2D-to-3D transformation process is shape memory effect, and naturally, a requisite characteristic of the polymer substrate for origami-inspired fabrication is to have a shape-memory capability. The notion of imparting elastomer-like shape memory effect to thermoplastic or crosslinked polymers may be based on three different mechanisms: thermal, photothermal, and photochemical mechanisms.

Sol-Gel, Film and Two and Three Dimensional Objects

Applicants disclose a sol-gel comprising a tri-functional crosslinked poly(amic acid), a tri-functional crosslinked poly(amide-amic acid) and/or a tri-functional crosslinked copolymer of poly(amic acid) and poly(amide-amic acid), said tri-functional crosslinked poly(amic acid), tri-functional crosslinked poly(amide-amic acid) and/or tri-functional crosslinked copolymer of poly(amic acid) and poly (amide-amic acid) each of said tri-functional crosslinked poly(amic acid), a tri-functional crosslinked poly(amide-amic acid) and/or a tri-functional crosslinked copolymer of poly(amic acid) and poly(amide-amic acid), said tri-functional crosslinked poly(amic acid), tri-functional crosslinked poly(amide-amic acid) and/or tri-functional crosslinked copolymer of poly(amic acid) and poly(amide-amic acid) comprising repeat units and non-terminal, phenylethynyl moieties, each of said repeat units independently comprising 0 to 4 of said non-terminal, phenylethynyl moieties per repeat unit with the proviso that not all of said repeat units comprise only 0 or only 1 of said non-terminal, phenylethynyl moieties, preferably each of said repeat units independently comprising 0 to 3 of said non-terminal, phenylethynyl moieties per repeat unit with the proviso that not all of said repeat units comprise only 0 or only 1 of said non-terminal, phenylethynyl moieties, more preferably each of said repeat units independently comprising 0 to 2 of said non-terminal, phenylethynyl moieties per repeat unit with the proviso that no more than about 40%, more preferably no more than about 50% of said repeat units comprise 0 of said non-terminal, phenylethynyl moieties per repeat unit; most preferably each of said repeat units independently comprising 0 to 2 of said non-terminal, phenylethynyl moieties per repeat unit with the proviso that no more than about 40%, more preferably no more than about 50% of said repeat units comprise 0 of said non-terminal, phenylethynyl moieties per repeat unit and the remaining repeat units comprise solely 1 or 2 of said non-terminal, phenylethynyl moieties.

Applicants disclose a film derived from a sol-gel according to Claim Paragraph 0040.

Applicants disclose a two or three dimensional object derived from the sol-gel according to Paragraph 0040.

Applicants disclose a two or three dimensional object derived from the film according to Paragraph 0041.

Crosslinked Polyimide and Poly(Amide-Imide) and Co-Polymers

Because of the similar polymerization chemistry to generate polyimides and poly(amide-imides), and co-polymers of polyimides and poly(amide-imides) the multi-functional crosslinking agents disclosed herein may be used to crosslink these classes of polymers to create covalent network structures capable of showing shape memory effects at elevated temperatures.

In this instant case, synthesis of a polyimide is typically accomplished by polymerization of a multiple-PE-containing diamine and a dianhydride in a 1:1 molar ratio to generate a poly(amic acid) precursor, which is then converted to the corresponding polyimide typically by either thermal cure (e.g., by heating to >200° C. in solution or solid state) or chemical imidization using a dehydrating agent or promoter such as acetic anhydride/triethylamine or acetic anhydride/pyridine. However, to generate a polyimide having the desired amount of crosslinking, an appropriately-terminated poly(amic acid) precursor is first generated by off-setting the dianhydride:diamine ratio. For example, to provide an amine-terminated poly(amic acid) precursor, the amount of diamine is used in excess to cap both ends of the poly(amic acid) precursor. An appropriate amount of a multi-anhydride crosslinking agent is then added to the precursor solution so that all or substantially all of the terminal amine groups will be consumed. Conversely, to provide an anhydride-terminated poly(amic acid) precursor, the amount of dianhydride-containing monomer is used in excess to cap both ends of the poly(amic acid) precursor. Then an appropriate amount of a multi-amine crosslinking agent is then added to the precursor solution so that all or substantially all of the terminal anhydride groups will be consumed. In either embodiment, crosslinked polyimides may then be created using appropriate imidization conditions.

Figure 1B:
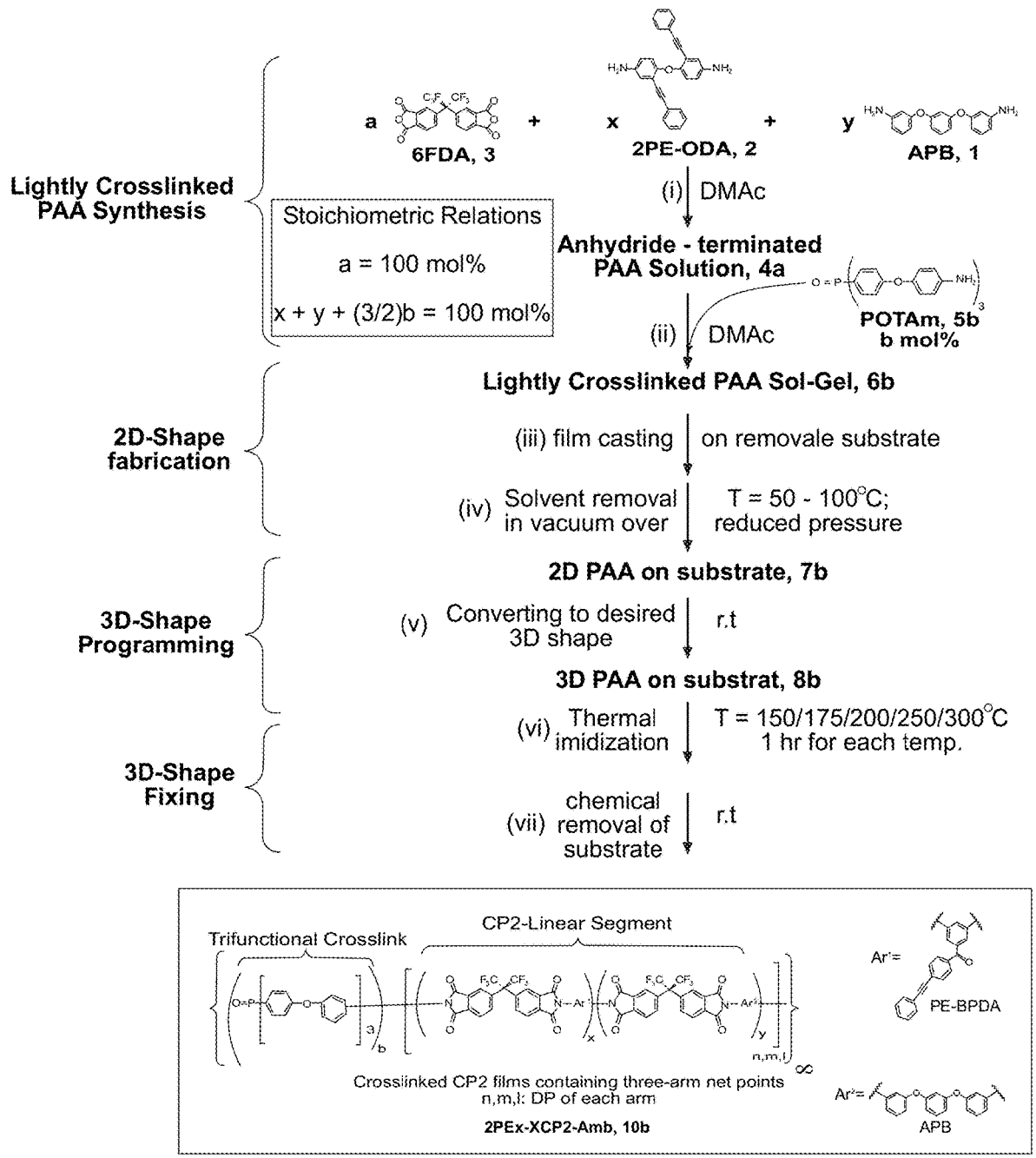
FIG. 1B is an exemplary scheme depicting the integrated process that combines the synthesis of lightly crosslinked polyamic acid (PAA), steps (i)-(ii), and fabrication of 3D object comprised of crosslinked polyimide (3D-XPI): 2D (film) and 3D fabrication, steps (iii)-(iv) and steps (v)-(vi), respectively, and removal of supporting substrate, step (vii). This example pertains to generation of anhydride-terminated PAA that reacts fully with stoichiometric amount of a triamine crosslinker (POTAm). The idealized structure of crosslinked polyimides, designated as 2PEx-XCP2-Amb where "x=mol % of 2PE-ODA", X denotes crosslinked and "b=mol % of phosphine-oxide triamine", is shown in the box.

In another embodiment as depicted in FIGS. 1A and 1B, synthesis of a co-polyimide is typically accomplished by polymerization of a PE-containing diamine, a non-PE diamine, and a dianhydride in an appropriate molar ratio to generate an either amine-terminated or anhydride-terminated a poly(amic acid) precursor, which is then converted to the corresponding polyimide typically by either thermal cure (e.g., by heating to >200° C. in solution or solid state) or chemical imidization using a dehydrating agent or promoter such as acetic anhydride/triethylamine or acetic anhydride/pyridine.

For generating the amine-terminated poly(amic acid), the appropriate molar ratio for the dianhydride (a moles), PE-diamine (x moles), non-PE diamine (y moles) and trianhydride crosslinker (b moles) follows the stoichiometric relations: $x+y=100$ mol % and $a+(3/2)b=100$ mol %.

For generating the anhydride-terminated poly(amic acid), the appropriate molar ratio for the dianhydride (a moles), PE-diamine (x moles), non-PE diamine (y moles) and trianhydride crosslinker (b moles) follows the stoichiometric relations: $a=100$ mol % and $x+y+(3/2)b=100$ mol %.

In accordance with an aspect of the polymer, the multiple PE-containing diamine, which includes, but is not limited to, 4,4'-oxybis(3-(phenylethynyl)aniline), 4,4'-methylenebis(3-(phenylethynyl)aniline), bis(4-amino-2-(phenylethynyl) phenyl)methanone, 4,4'-sulfonylbis(3-(phenylethynyl)aniline), 4-(4-amino-2-(phenylethynyl)phenoxy)-3,5-bis (phenylethynyl)aniline, 4-(4-amino-2-(phenylethynyl) benzyl)-3,5-bis(phenylethynyl)aniline, (4-amino-2,6-bis (phenylethynyl)phenyl)(4-amino-2-(phenylethynyl)phenyl) methanone, 4-(4-amino-2-(phenylethynyl)phenylsulfonyl)-3,5-bis(phenylethynyl)aniline, 4,4'-oxybis(3,5-bis (phenylethynyl)aniline), 4,4'-methylenebis(3,5-bis (phenylethynyl)aniline), 4,4'-carbonylbis(3,5-bis (phenylethynyl)aniline), and 4,4'-sulfonylbis(3,5-bis (phenylethynyl)aniline).

In accordance with an aspect of the co-polymer, the diamine co-monomer comprises an aromatic diamine, which includes, but is not limited to, 1,3-bis(3-aminophenoxy) benzene (APB); 1,4-bis(3-aminophenoxy)benzene; 1,2-bis (3-aminophenoxy)benzene; 1,2-bis(4-aminophenoxy)benzene; 1,3-bis(4-aminophenoxy)benzene; 1,4-bis(4-aminophenoxy)benzene; 3,4'-oxydianiline; 4,4-oxydianiline; 1,3-diamino-4-methylbenzene; 1,3-diamino-4-(trifluoromethyl)benzene; 2,4-diaminobiphenyl; 2,2-bis (4-aminophenyl)-1,1,1,3,3,3-hexafluoropropane; 2,2-bis(4-aminophenyl)propane; 2,2-bis[4-(4-aminophenoxy)phenyl]-1,1,1,3,3,3-hexafluoropropane; 2,2-bis[4-(4-aminophenoxy) phenyl]propane; or a mixture of thereof.

In accordance with another aspect, the dianhydride monomer includes, but is not limited to 2,2-[bis(4-phthalic anhydrido)]-1,1,1,3,3,3-hexafluoroisopropane (6FDA); 4,4'-oxybis(phthalic anhydride); 3,3',4,4'-diphenylsulfone tetracarboxylic dianhydride; 3,3',4,4'-benzophenone tetracarboxylic dianhydride; 4,4'-(2,2,2-trifluoro-1-phenylethylidene)bis[phthalic anhydride]; 2,2-bis[4-(3,4-dicarboxyphenoxy)phenyl]propane dianhydride; 4,4'-(p-phenylenedioxy)bis[phthalic anhydride]; 4,4'-(m-phenylenedioxy)bis[phthalic anhydride]; 4,4'-(o-phenylenedioxy)bis[phthalic anhydride]; or mixtures thereof.

The synthesis of a poly(amide-imide) is typically accomplished by polymerization of i) a diamine and a trimellitic anhydride (TMA) or trimellitic anhydride acid chloride (TMAC); or ii) a diamine and a diimide-dicarboxylic acid monomer derived from a selective condensation of TMA and an aromatic diamine (e.g., $H_2N$—Ar—$NH_2$). When acid monomers are used, the polymerization process is aided by triethylphosphite/pyridine (Yamazaki-Higashi reagent) in a 1:1 molar ratio in an amide solvent such as N,N-dimethylformamide (DMF), N,N-dimethylacetamide (DMAc), N-methylpyrrolidone (NMP), etc.

Persons having ordinary skill in the art will appreciate that these polymerization methods may be applied to other dianhydride monomers containing pre-formed aromatic amide moieties. For example, bis(phthalic anhydride) monomers with preformed amide as part of the linking group, which are also known as diamide-dianhydrides (DADA), can be prepared from trimellitic anhydride acid chloride (TMAC) and an aromatic diamine (e.g., $H_2N$—Ar—$NH_2$) in refluxing acetone with pyridine as HCl scavenger.

However, to generate a poly(amide-imide) having the desired amount of crosslinking, an appropriately-terminated poly(amide-imide) may be first generated via Yamazaki-Higashi reaction by off-setting TMA:diamine ratio. To make the amine-terminated poly(amide-imide), the amount of diamine is in excess to cap both ends of the polymer. After the amino-terminated polyamide has been isolated by precipitation in methanol and filtration, it is washed with methanol and dried in vacuo overnight. The amino-terminated polyamide can then be dissolved or suspended in an amide solvent and mixed with an amide solution of a multi-anhydride crosslinking agent in an appropriate amount so that all or substantially all of the terminal amine groups are consumed, which is immediately followed by casting and thermal curing under reduced pressure to create crosslinked poly(amide-imide) films. Conversely, to make the anhydride-terminated poly(amide-imide), the amount of amine monomer is not used in excess and thus is the limiting reagent.

In a preferred method to generate a poly(amide-imide) having the desired amount of crosslinking, it is more suitable that an appropriately-terminated poly(amide-amic acid) is first generated by off-setting the DADA:diamine ratio so that either diamide-dianhydride or diamine is in excess. In the former case, anhydride-terminated poly(amide-amic acid) is generated, and in the latter case, amine-terminated poly(amide-amic acid). Then an appropriate amount of a multi-amine crosslinking agent or multi-anhydride crosslinking agent is then added to the respective precursor solution so that all or substantially all of the reactive terminal groups will be consumed. (See Paragraphs 0046 and 0047 for the stoichiometric relations for determining the appropriate amounts of DADA, PE-diamine, nonPE-diamine and tri-functional crosslinker.) This is immediately followed by casting and thermal curing under reduced pressure to create crosslinked poly(amide-imide) films.

The ability to vary the amount of crosslinking allows the synthesis of crosslinked polyimides and poly(amide-imides) with mechanical properties (i.e. $T_g$) tailored to a specific application or to specific environmental conditions. A generalized method for incorporating a sufficient amount of functionalization in the poly(amic acid)-containing precursor may be based on the desired degree of crosslinking in the resultant polyimide or poly(amic acid). For example, the general method can include selecting the desired multi-functional crosslinking agent (e.g., amine- or anhydride-functionalized) and the desired amount of crosslinking (x mol %), and then preparing the appropriately functionalized poly(amic acid)-containing precursor by employing the excess monomer in an amount of about (100+1.5x) mol %. The limiting reagent is based on 100 mol %. In one embodiment, the amount of multi-functional crosslinking agent used to crosslink the poly(amic acid) may vary from about 0.3 mol % to about 10 mol %. In another embodiment, the amount of multi-functional crosslinking agent used to crosslink the poly(amic acid) may vary from about 0.5 mol % to about 5 mol %. For example, the multi-functional crosslinking agent concentration about 0.5 mol %, about 1.0 mol %, about 2.0 mol %, or about 5.0 mol %.

Multi-Anhydride Crosslinking Agents

In accordance with an embodiment of the present invention, a multifunctional crosslinking agent is provided that has three or four anhydride functional groups (i.e., tri-anhydride crosslinking agents or tetra-anhydride crosslinking agents, respectively). The multifunctional crosslinking agents may be defined by the general chemical Formula (I): Z—(—Ar—)$_n$—W, wherein Z represents an anhydride functional group that is directly or indirectly bonded to Ar; wherein Ar represents an aryl group that is directly bonded to W; and wherein n is equal to 3 when W is N or P=O, or n is equal to 4 when W is Si or an sp3 hybridized carbon moiety. Accordingly, the tri-anhydride crosslinking agents may be Z—(—Ar—)$_3$N or Z—(—Ar—)$_3$P=O; and the tetra-anhydride crosslinking agents may be Z—(—Ar—)$_4$Si or Z—(—Ar—)$_4$R, where R represents the carbon moiety (e.g., fluorenyl).

In accordance with an aspect of the invention, the aryl group (Ar), which is directly bonded to W through a carbon atom, may be a phenyleneoxy group (—OPh-) that is para- or meta-substituted with respect to oxygen, and thus the agent may be further defined by the general chemical Formula (II): Z—(—OPh-)$_n$—W. In one embodiment, the phenyleneoxy group represents that the benzene ring portion may unsubstituted (i.e., $OC_6H_4$); alternatively, the phenyleneoxy group may have substituents (e.g., $C_1$-$C_4$ alkyl groups) around the benzene ring. In one example, where W is P=O, the agent may be further defined by the general chemical Formula (III): Z—(—OPh-)$_3$—P=O. In accordance with another aspect, the aryl group (Ar) may be a phenyleneoxy group (—OPh-) that is para- or meta-substituted with respect to oxygen, and Z may be a phthalic anhydride group that is connected to the phenyleneoxy group through an ether bond. Accordingly, the agent may be further defined by the general chemical Formula (IV) below:

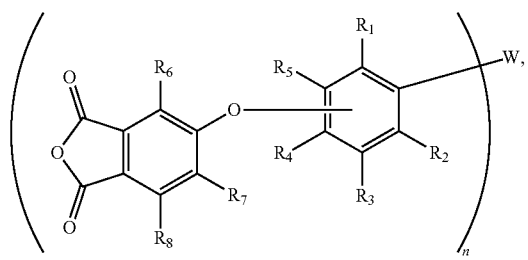

wherein W and n are as defined above, and $R_1$ through $R_8$ are independently selected from H or $C_1$-$C_4$ alkyl. Where W is P=O, these phosphine oxide-based crosslinking agents may be defined by the general chemical Formula (V) below:

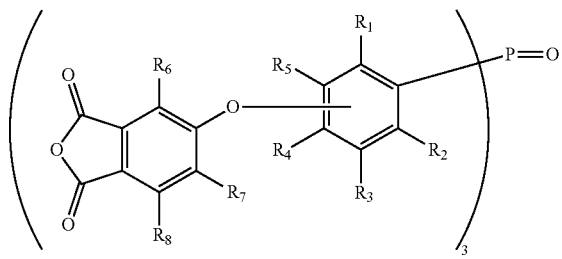

Exemplary phosphine oxide-based crosslinking agents are tris[4-(3,4-dicarboxyphenoxy)phenyl]phosphine oxide tri-anhydride (where $R_1$ to $R_3$ and $R_5$ to $R_8$ are H), and its meta-isomer, which is tris[3-(3,4-dicarboxyphenoxy)phenyl]phosphine oxide tri-anhydride (i.e., where $R_1$ to $R_4$ and $R_6$ to $R_8$ are H).

In accordance with yet another aspect, where W is N, and where the aryl group (Ar) is the phenyleneoxy group (—OPh-), which is para- or meta-substituted with respect to oxygen, a tertiary amine-based crosslinking agent may be defined by the general chemical Formula (VI): (Z—OPh-)$_3$N. In another embodiment, where Z is the phthalic anhydride group that is connected to the phenyleneoxy group through an ether bond, exemplary tertiary amine-based crosslinking agents may be defined by the general chemical Formula (VII) below:

Exemplary tertiary amine-based crosslinking agents are tris[4-(3,4-dicarboxyphenoxy)phenyl]amine tri-anhydride (where $R_1$ to $R_3$ and $R_5$ to $R_8$ are H), and its meta-isomer, which is tris[3-(3,4-dicarboxyphenoxy)phenyl]amine tri-anhydride (i.e., $R_1$ to $R_4$ and $R_6$ to $R_8$ are H).

In accordance with another embodiment, complementary tetra-anhydride crosslinking agents include where W (in Formulas (I), (II), and (IV)) is a carbon moiety, and thus n is 4. Further, exemplary carbon-based tetra-anhydride crosslinking agents 4a, 4b, and 5c are also shown in Table 1. The carbon moiety may include a central sp$^3$-hybridized carbon to provide a generally tetrahedral geometry to the agent. For example, agents 4a and 4b include a fluorenyl group, where the C$_9$ carbon of the fluorenyl group is sp$^3$ hybridized.

As also shown in Table 1, the complementary tetra-anhydride crosslinking agents include where W (in Formulas (I), (II), and (IV)) is silicon or an sp$^3$ hybridized carbon, and thus n is 4. Further, exemplary silicon-based (5a and 5b, E=Si) or sp$^3$ hybridized carbon-based (5c and 5d, E=C) tetra-anhydride crosslinking agents are also shown in Table 1 below.

TABLE 1

Exemplary Multi-Anhydride Crosslinking Agents

Tri-anhydride crosslinkers

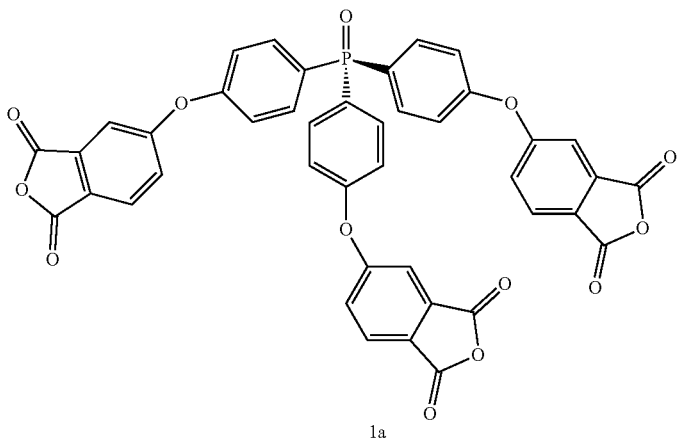

1a

TABLE 1-continued
Exemplary Multi-Anhydride Crosslinking Agents
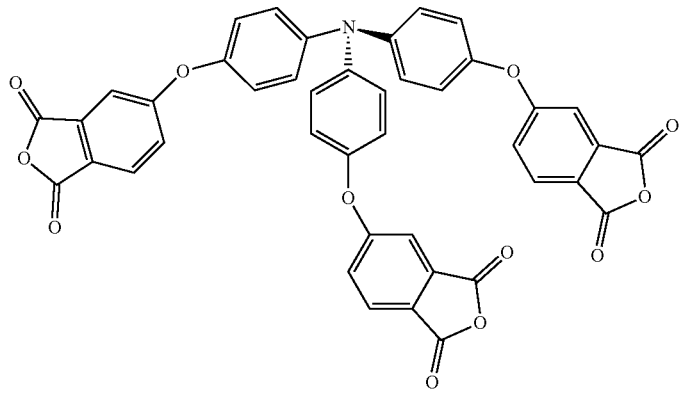
2a
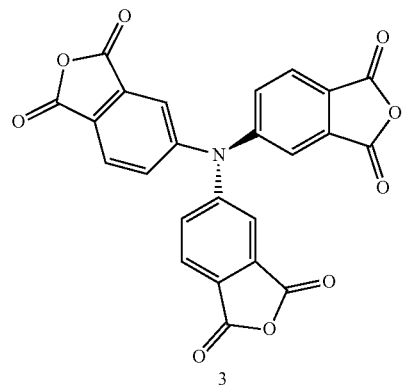
3
Tetra-anhydride crosslinkers
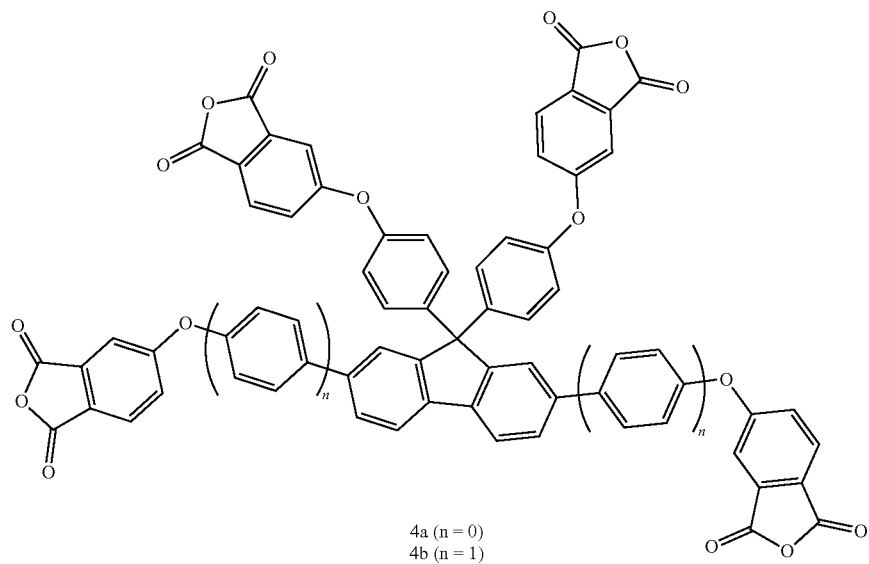
4a (n = 0)
4b (n = 1)

TABLE 1-continued

Exemplary Multi-Anhydride Crosslinking Agents

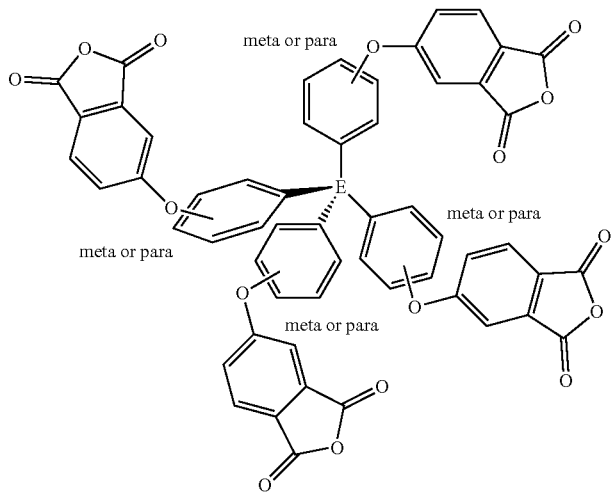

5a (E = Si; all para)
5b (E = Si; all meta)
5c (E = C; all para)

In accordance with an embodiment, the crosslinked polyimides obtained with the multi-anhydride crosslinking agents may be defined by the following general chemical Formula (VIII) below:

example, in an embodiment, DP is in a range of about 5 to about 25, or about 10 to about 20 and the molar content of the crosslinker is in the range of b=0.1% to 5%. The overall network structure is denoted by the infinity symbol (co). The

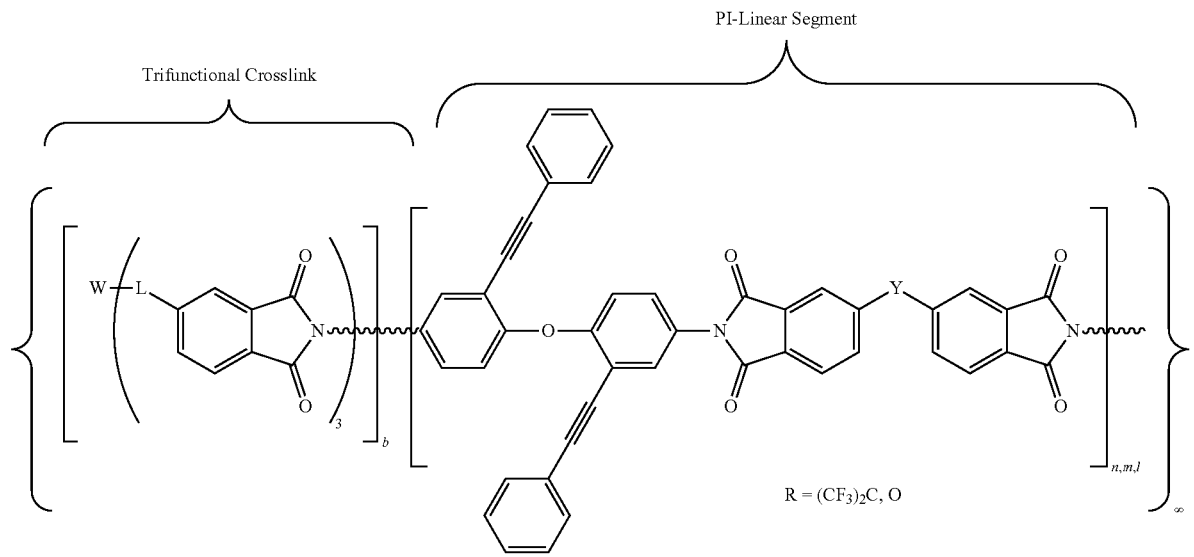

where W may be P=O, N, Si, or a carbon moiety (e.g., fluorenyl); wherein L denotes either a direct covalent bond to W or a linking group (e.g., a phenyleneoxy group) for indirect bonding to W; n, m, l denote the degree of polymerization (DP) of each branch of polyimide, which may be of the same or different values, with the DP range of about 3 to about 30; b denotes the mol % of crosslinker. For linking group Y is one of the following moieties: —C(CF$_3$)$_2$—, —O—, —SO$_2$—, —C(=O)—, —(Ph)C(CF$_3$)—, —OPh-C(CF$_3$)$_2$—OPh-, —OPh-C(CH$_3$)$_2$—OPh-.

In accordance with another embodiment, the crosslinked co-polyimides obtained with the multi-anhydride crosslinking agents may be defined by the following general chemical Formula (IX) below:

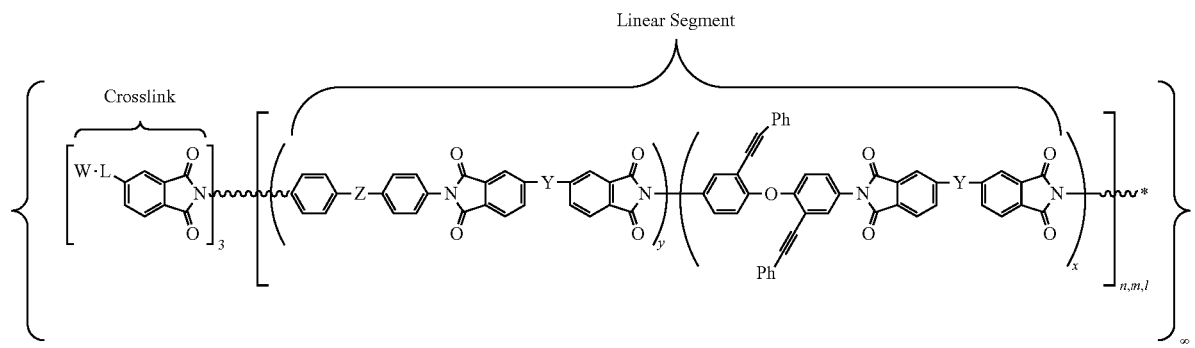

where W may be N or P=O; Y is one of the following moieties: —C(CF$_3$)$_2$—, —O—, —SO$_2$—, —C(=O)—, —(Ph)C(CF$_3$)—, —OPh-C(CF$_3$)$_2$—OPh-, and —OPh-C(CH$_3$)$_2$—OPh-; Z is one of the following: O, -(pC$_6$H$_4$O)-(pC$_6$H$_4$O)-(pC$_6$H$_4$)—, -(pC$_6$H$_4$O)-(mC$_6$H$_4$O)-(pC$_6$H$_4$)— and -(mC$_6$H$_4$O)-(mC$_6$H$_4$O)-(mC$_6$H$_4$)—; x, y denote the molar ratio of the linear subunit respectively with or without a 2PE-ODA moiety and x+y=100 mol % b; n, m, and l are degrees of polymerization (DP) of each branch of the crosslinked aromatic polyimide; and the infinity symbol (co) is used to denote an infinite network structure for a crosslinked polymer.

In accordance with yet another embodiment, the crosslinked polyimides obtained with the multi-anhydride crosslinking agents may be defined by the following general chemical Formula (X) below:

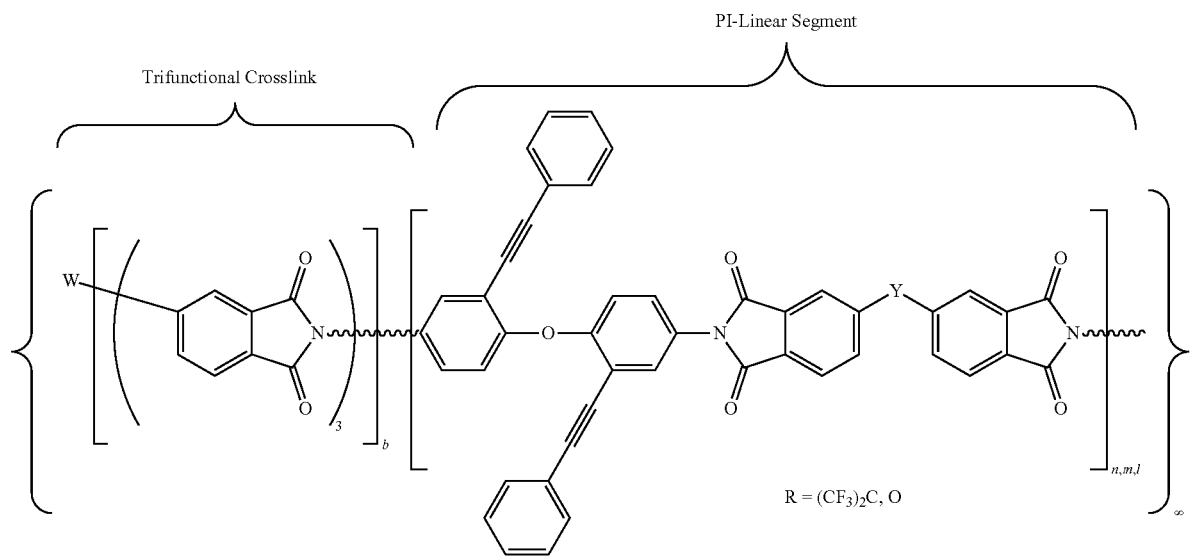

where W is N or benzene-1,3,5-trioxy (1,3,5-C$_6$H$_3$O$_3$); b denotes the molar content of the trifunctional crosslinker, and n, m, l, and Y are as defined above.

In accordance with yet another embodiment, the crosslinked co-polyimides obtained with the multi-anhydride crosslinking agents may be defined by the following general chemical Formula (XI) below:

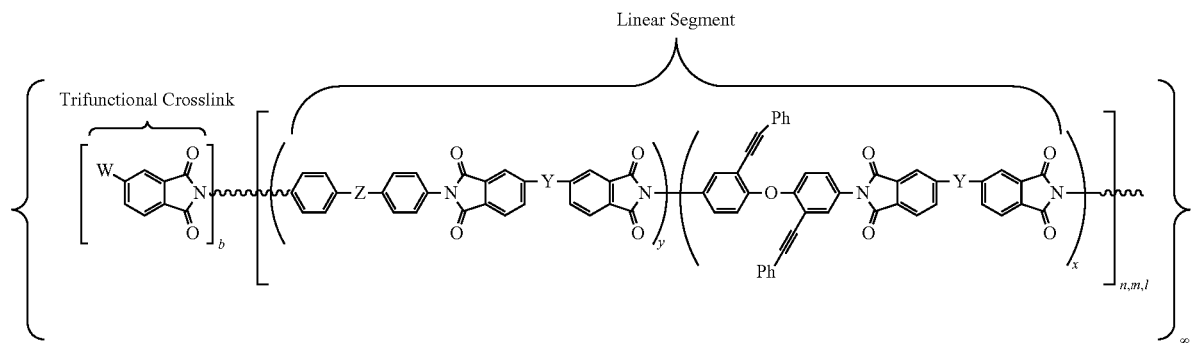

where W is N or benzene-1,3,5-trioxy (1,3,5-$C_6H_3O_3$); x, y and b denote the molar contents of the multiphenylethynyl-(2PE) containing diamine, non-PE diamine and crosslinker, in that order see Paragraph 0046 for the stoichiometric relations of x, y and b); and n, m, l, and Y are as defined above.

In accordance with another embodiment, the crosslinked poly(amide-imide)s obtained with the multi-anhydride crosslinking agents may be defined by the following general chemical formula (XII):

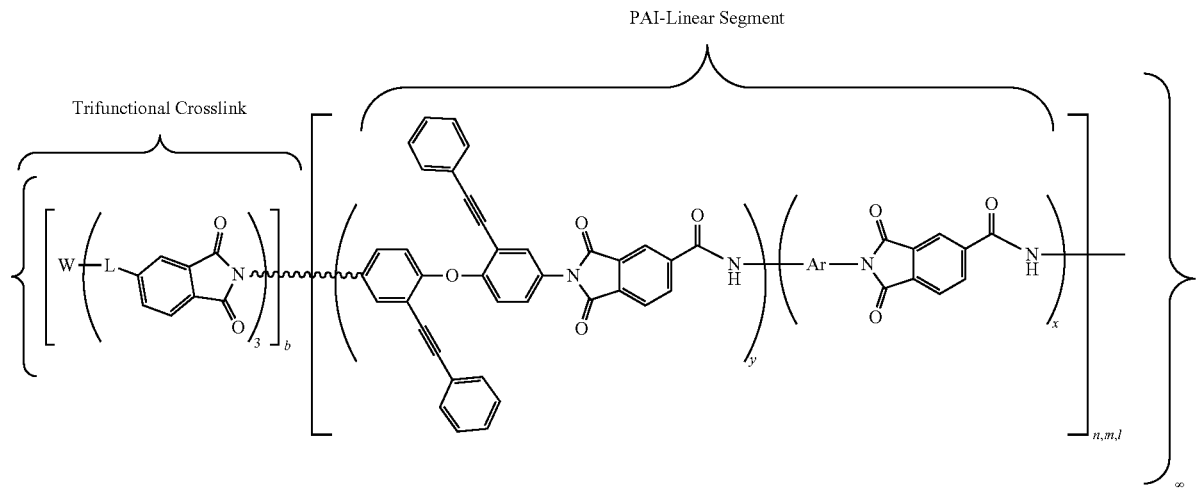

where W may be P=O, N, Si, or a carbon moiety (e.g., fluorenyl); wherein L denotes either a direct covalent bond to W or a linking group (e.g., a phenyleneoxy group) for indirect bonding to W; Ar is one of the following moieties: —$C_6H_4$—(-Ph-), —$C_6H_4$—R—$C_6H_4$— where R=O, $(CF_3)_2C$, $SO_2$, O—$C_6H_4$—O (oxyphenyleneoxy group); x, y denote the molar ratio of the linear subunit respectively with or without a 2PE-ODA moiety and x+y=100 mol %; b denotes the molar content of the crosslinker (see Paragraph 0046 for the stoichiometric relations of x, y and b); n, m, l denote the degree of polymerization (DP) of each branch of polyimide, which may be of the same or different values, with the DP range of about 3 to about 30. For example, in an embodiment, DP is in a range of about 5 to about 25, or about 10 to about 20. The overall network structure is denoted by the infinity symbol (∞).

Multi-Amine Crosslinking Agents:

In accordance with an embodiment of the present invention, a multifunctional crosslinking agent is provided that has three amine functional groups (i.e., tri-amine crosslinking agent). The tri-amine crosslinking agent may be defined by the general chemical Formula (IX): $(H_2N—Ar—)_3—W$, wherein Ar represents an aryl group that is directly or indirectly bonded to W; and wherein W may be $CH_3C$ (methylcarbyl); N (trivalent nitrogen); P=O (phosphine oxide); or $BO_3$ (borate). Accordingly, the tri-amine crosslinking agents may be $(H_2N—Ar—)_3—CCH_3$, $(H_2N—Ar—)_3—N$, $(H_2N—Ar—)_3—P=O$, or $(H_2N—Ar—)_3—BO_3$. In an embodiment, the Ar is a biaryl ether, and thus the tri-amine crosslinking agent may be further defined by the general Formula (X): $(H_2N—Ar'—O—Ar''—)_3—W$, where Ar' and Ar" may be similarly or differently substituted, and where the various isomers are further contemplated.

According to yet another embodiment, the tri-amine crosslinking agent is a tri(oxybenzene-amine) crosslinker having the following general Formula (XIII) below:

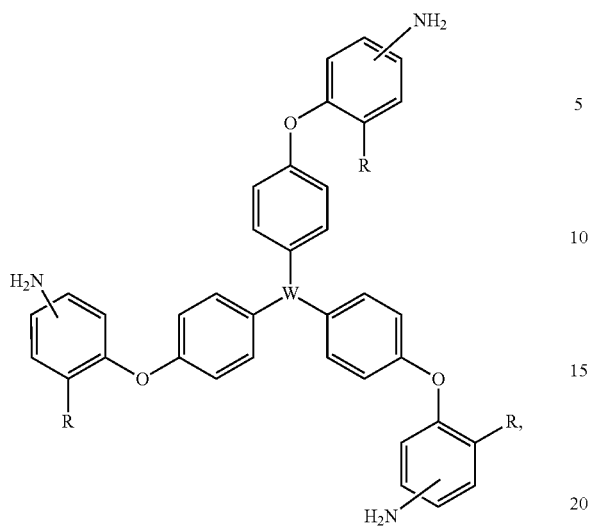

wherein W may be CH₃C (methylcarbyl); N (trivalent nitrogen); P=O (phosphine oxide); or BO₃ (borate); R may be H, F, Cl, CF₃, or CH₃; and the amine groups (—NH₂) may be in the meta or para position with respect to oxygen of the biaryl ether bond. Exemplary tri(oxybenzene-amine) crosslinking agents 6a,b; 7a,b; 8a,b; and 9a,b are shown in Table 2.

TABLE 2

Exemplary Tri(oxybenzene-amine) Crosslinking Agents

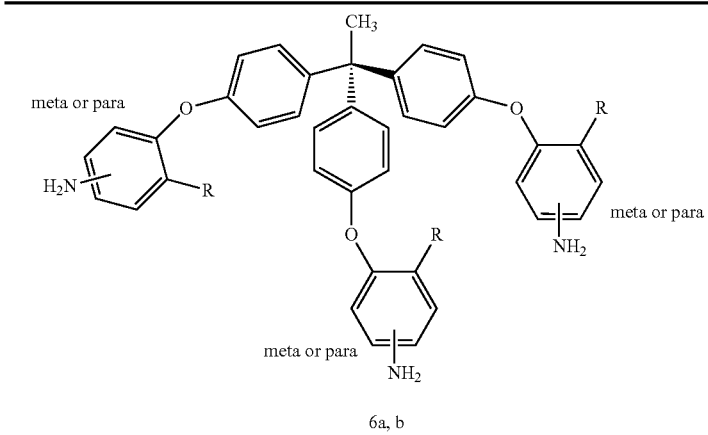

6a, b

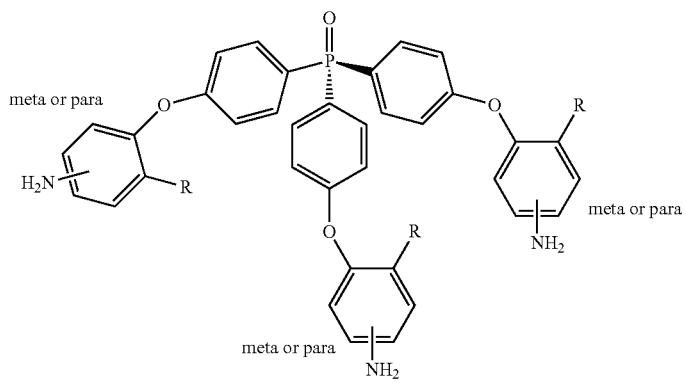

7a, b

TABLE 2-continued

Exemplary Tri(oxybenzene-amine) Crosslinking Agents

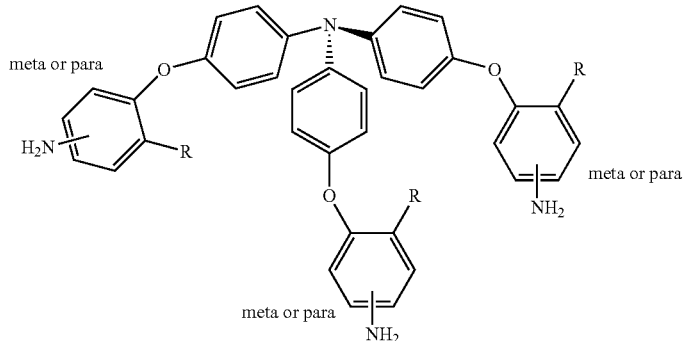

8a, b

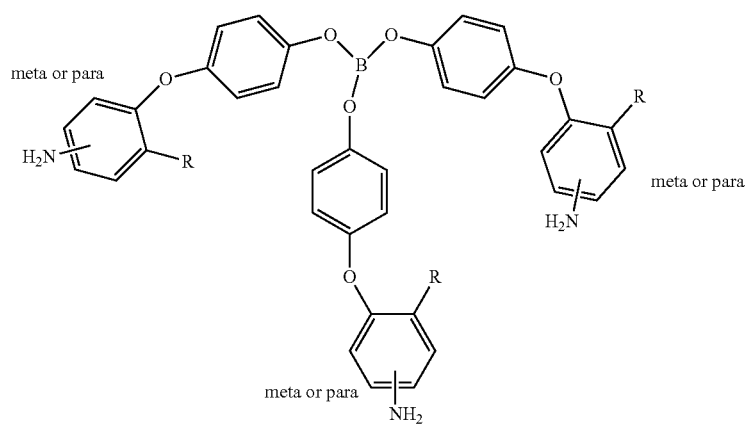

9a, b

Exemplary crosslinked aromatic homopolyimides and copolyimides obtained from the tri(oxybenzene-amine) crosslinking agents (where R=H) have the following general Formula (XIV) below:

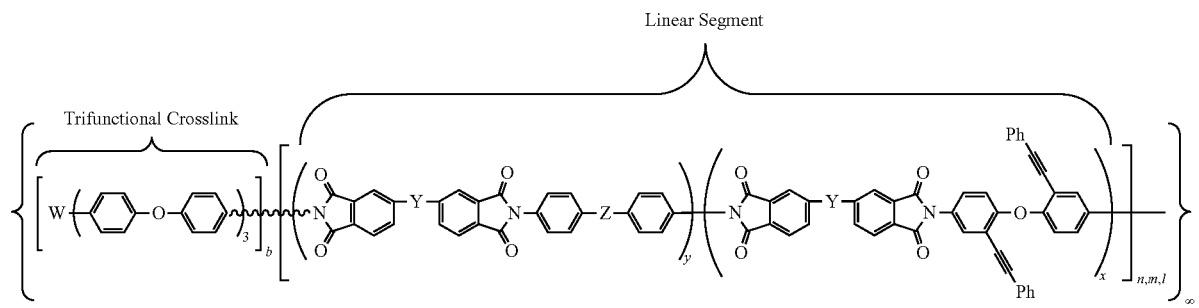

wherein Y is selected from the group consisting of —C(CF$_3$)$_2$—, —O—, —SO$_2$—, C=O—, —(Ph)C(CF$_3$)—, —OPh-C(CH$_3$)$_2$-PhO—, —O(1,3-Ph)O— and —O(1,4-Ph)O—; Z is one of the following: O, -(pC$_6$H$_4$O)-(pC$_6$H$_4$O)-(pC$_6$H$_4$)—, -(pC$_6$H$_4$O)-(mC$_6$H$_4$O)-(pC$_6$H$_4$)— and -(mC$_6$H$_4$O)-(mC$_6$H$_4$O)-(mC$_6$H$_4$)—; n, m, and l are degrees of polymerization (DP) of each branch of the crosslinked aromatic polyimide; and the infinity symbol (∞) is used to denote an infinite network structure for a crosslinked polymer. For homopolyimides, x=100 mol % and y=0 mol %. For copolyimides, x+y=100 mol %.

In accordance with another embodiment, exemplary crosslinked aromatic poly(amide-imide)s obtained from the tri(oxybenzene-amine) crosslinking agents (where R=H) have the following general Formula (XV) below:

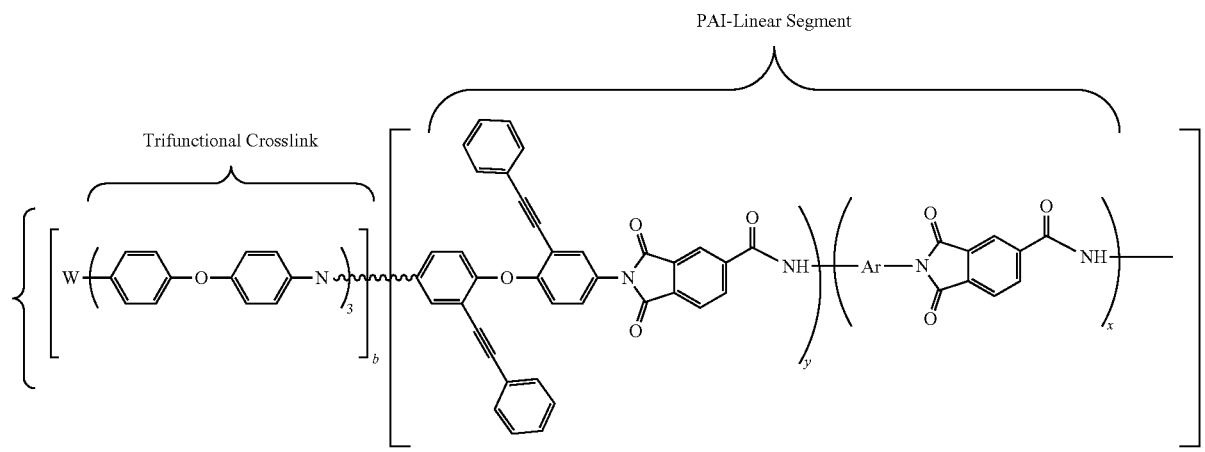

where Ar is one of the following moieties: —$C_6H_4$—(-Ph-), —$C_6H_4$—R—$C_6H_4$— where R=O, $(CF_3)_2C$, $SO_2$, O—$C_6H_4$—O (oxyphenyleneoxy group); x, y denote the molar contents of the linear subunit respectively with or without a 2PE-ODA moiety b denotes the molar content of the crosslinker (the stoichiometric relation of x, y and b is x+y+(3/2)b=100 mol % see Paragraph 0047); n, m, 1 denote the degree of polymerization (DP) of each branch of polyimide, which may be of the same or different values, with the DP range of about 3 to about 30. For example, in an embodiment, DP is in a range of about 5 to about 25, or about 10 to about 20. The overall network structure is denoted by the infinity symbol (co).

Similar to the crosslinked polymers obtained using the multi-anhydride crosslinking agents, the degrees of polymerization (DP) of each branch of the crosslinked aromatic polyimide may be the same or different. In one exemplary embodiment, the DPs are the same with respect to one another. In another embodiment, at least one of the DPs is different. In another embodiment, the DP of each branch may be in a range of about 3 to about 110 units. In an alternative embodiment, the DP may be in a range of about 3 to about 30, or about 5 to about 55 units. For example, in another embodiment, DP is in a range of about 5 to about 25, or about 10 to about 20.

The extent and amount of crosslinking (expressed as b mol %) in the crosslinked polyimide polymers and films may be altered by varying the concentration of the tri-amine crosslinker (i.e. about 0.5 mol %, about 1.0 mol %, about 2.0 mol %, or about 5.0 mol %). In one embodiment, the tri-amine crosslinker concentration may vary from about 0.3 mol % to about 10 mol %. In another embodiment, the tri-amine crosslinker concentration may be between about 0.5 mol % to about 5 mol %. The ability to vary the amount of crosslinking allows the synthesis of crosslinked polyimides with mechanical properties (i.e. $T_g$) tailored to a specific application or to specific environmental conditions.

EXAMPLES

The following examples and methods are presented as illustrative of the present invention or methods of carrying out the invention, and are not restrictive or limiting of the scope of the invention in any manner.

Example 1 With reference to FIGS. 1A and 1B, exemplary integrated processing chemistry that is used to generate either tri-anhydride or tri-amine crosslinked polyimide films from their respective reactive polyamic acid (PAA) solution and crosslinker, i.e either amine-terminated or anhydride-terminated PAA on a supporting 2D substrate (e.g. aluminum surface) are provided. CP2 (LaRC™—CP2, NASA Langley Research Center) is an exemplary fluorinated polyimide derived from 2,2-bis(4-phthalic anhydrido)-1,1,1,3,3,3-hexafluoroisopropane (6FDA) and 1,3-bis(3-aminophenoxy)benzene (APB). The subject polyimide (CP2) is selected to prove the concept because it is a well-known and well-characterized polyimide derived from 2,2-bis(4-phthalic anhydrido)-1,1,1,3,3,3-hexafluoroisopropane (6-FDA, a dianhydride monomer) and 1,3-bis(3-aminophenoxy)benzene (APB, a diamine monomer). Briefly, CP2 is a high-performance aerospace-grade polyimide that possesses remarkable properties including, high mechanical toughness, solvent resistance, high glass transition temperature, ultraviolet radiation resistance, low color, low solar absorption, and high thermal and thermo-oxidative stability. CP2 is particularly suitable for long-term survivability in space environments, and has been used to develop lightweight, inflatable structures that serve as Gossamer-like spacecraft, satellites, and solar energy collection/reflection systems. Addition of high-temperature shape-memory capability to CP2 and related polyimides will extend their applications where robust, dynamic properties are required under extremely hot conditions. Still referring to FIG. 1A, the origami-inspired fabrication process is based on the processing chemistry of poly(amic acid)/polyimide using either a triphenylphosphine-based trianhydride (4a) or triamine (4b) as a crosslinker. In this process, when the trianhydride crosslinker (x mol %) is used (i.e. process A), the co-monomers, APB (a diamine, 1), 2PE-ODA (2, a multiple-phenylethynyl-containing diamine such as 4,4'-oxybis(3-(phenylethynyl)aniline) and 6FDA (a dianhydride, 3) were dissolved under nitrogen atmosphere in a polar aprotic solvent such as N,N-dimethylacetamide (DMAc) (5 wt % polymer concentration) at room temperature for 24 h with excess APB (i.e. 1.5× mol % excess where x=mol % of trianhydride crosslinker used) for the preparation of poly(amic acid) oligomers (PAA oligomers, 4a) with reactive amine function as end groups. Subsequently, the trianhydride crosslinker (e.g. phosphine oxide trianhydride, 5a; x mol %) was added to the solution of PAA oligomers with a reaction stoichiometric ratio of the amino group to the terminal acid anhydride. After the crosslinker had completely dissolved, the resulting PAA sol-gel (6a) was immediately used in the fabrication of origami object as described in the following paragraph. Alternatively in the process B as depicted in FIG. 1B, when a triamine crosslinker is used, anhydride-terminated PAA (4b) solution is generated from the initial polymerization mixture of excess dianhydride monomers and diamine monomer, followed by addition of stoichiometrically balanced amount of the triamine crosslinker (5b) to result in the modified PAA sol-gel (6b) for immediate used in the fabrication of an origami object.

Figure 2A:
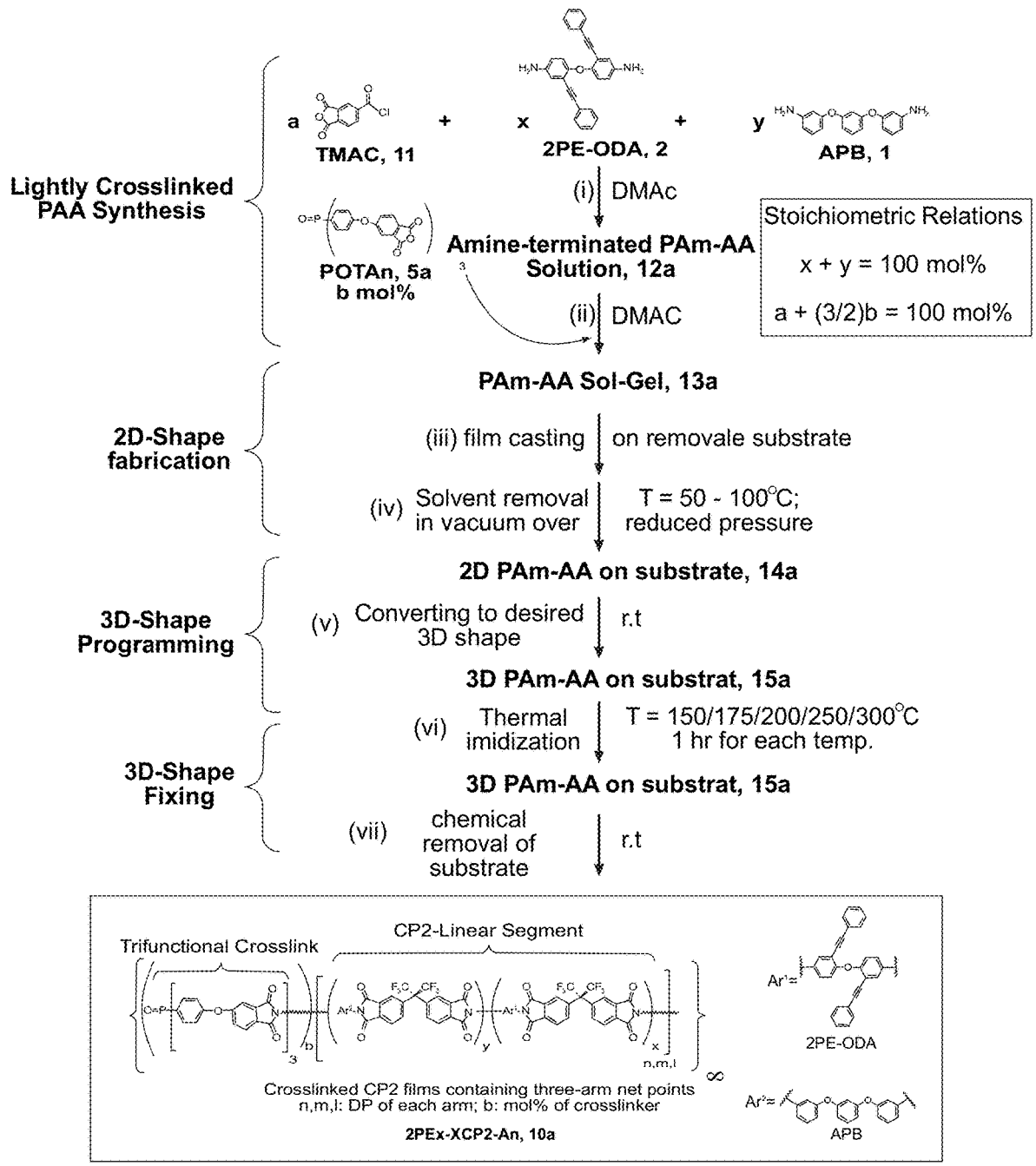
FIG. 2A is an exemplary scheme depicts the integrated process that combines the synthesis of lightly crosslinked poly(amide-amic acid) (PAm-AA), steps (i)-(ii), and fabrication of 3D object comprised of crosslinked poly(amide-imide) (3D-XPAI): 2D (film) and 3D object fabrication, steps (iii)-(iv) and steps (v)-(vi), respectively, and removal of supporting substrate, step (vii). This example pertains to generation of amine-terminated PAm-AA that reacts fully with stoichiometric amount of a trianhydride crosslinker (POTAn). The idealized structure of crosslinked polyimides, designated as 2PEx-XPAI-Anb where "x=mol % of 2PE-ODA", X denotes crosslinked and "b=mol % of phosphine-oxide trianhydride", is shown in the box.
Figure 2B:
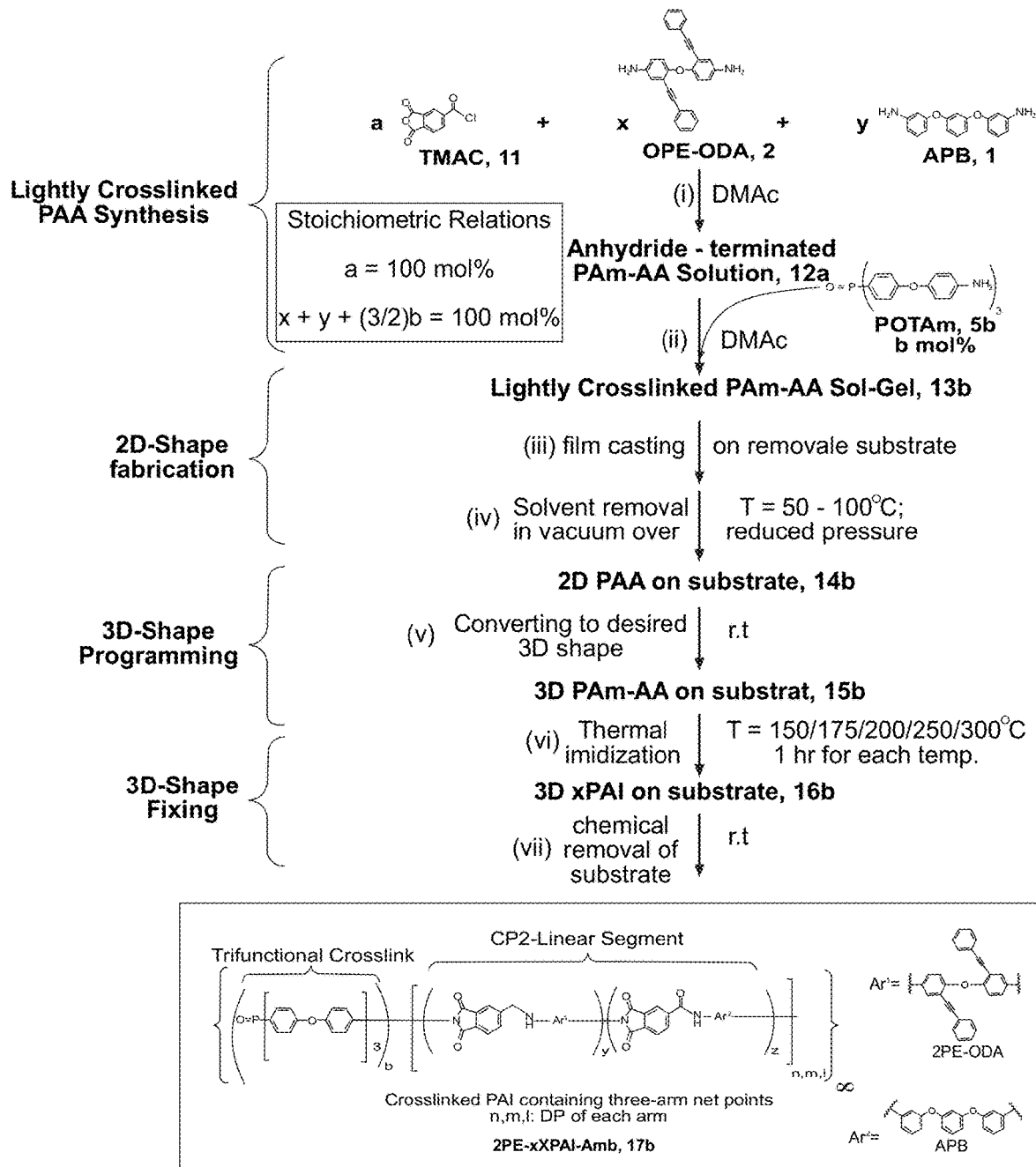
FIG. 2B is an exemplary scheme depicting the integrated process that combines the synthesis of lightly crosslinked poly(amide-amic acid) (PAm-AA), steps (i)-(ii), and fabrication of 3D object comprised of crosslinked poly(amide-imide) (3D-XPAI): 2D (film) and 3D object fabrication, steps (iii)-(iv) and steps (v)-(vi), respectively, and removal of supporting substrate, step (vii). This example pertains to generation of amine-terminated PAm-AA that reacts fully with stoichiometric amount of a trianhydride crosslinker (POTAn). The idealized structure of crosslinked polyimides, designated as 2PEx-XPAI-Anb where "x=mol % of 2PE-ODA", X denotes crosslinked and "b=mol % of phosphine-oxide trianhydride", is shown in the box.

Example 2 FIGS. 2A and 2B illustrate the origami-inspired fabrication process that is based on the processing chemistry of poly(amide-amic acid)/poly(amide-imide) (Pam-AA/PAI) using either a triphenylphosphine-based trianhydride (5a) or triamine (5b) as a crosslinker, respectively. When the trianhydride crosslinker (x mol %) is used (i.e. process A'), the co-monomers, APB (a diamine, 1), 2PE-ODA (a phenylethynyl-containing diamine, 2) and TMAC (trimellitic anhydride-chloride, an anhydride-acid-chloride monomer, 11) were dissolved under nitrogen atmosphere in a polar aprotic solvent such as N,N-dimethylacetamide (DMAc) (5 wt % polymer concentration) at room temperature for 24 h with excess APB (i.e. 1.5× mol % excess where x=mol % of trianhydride crosslinker used) for the preparation of oligo(amide-amic acid) (PAm-AA oligomers, 12a) with reactive amine function as end groups. Subsequently, the trianhydride crosslinker (e.g. phosphine oxide trianhydride, 5a; x mol %) was added to the solution of PAm-AA oligomers with a reaction stoichiometric ratio of the amino group to the terminal acid anhydride. After the crosslinker had completely dissolved, the resulting PAm-AA sol-gel (13a) was immediately used in the fabrication of origami (3D) object as described in Example 3.

Alternatively in the process B' as depicted in FIG. 2B, when a triamine crosslinker (5b) is used, anhydride-terminated PAm-AA (12b) solution is generated from the initial polymerization mixture of excess anhydride-acid chloride monomer (TMAC) and the two diamine monomers, followed by addition of stoichiometrically balanced amount of the triamine crosslinker to result in the modified PAm-AA sol-gel (13b) for immediate used in the fabrication of an origami object as described in Example 5.

Figure 3:
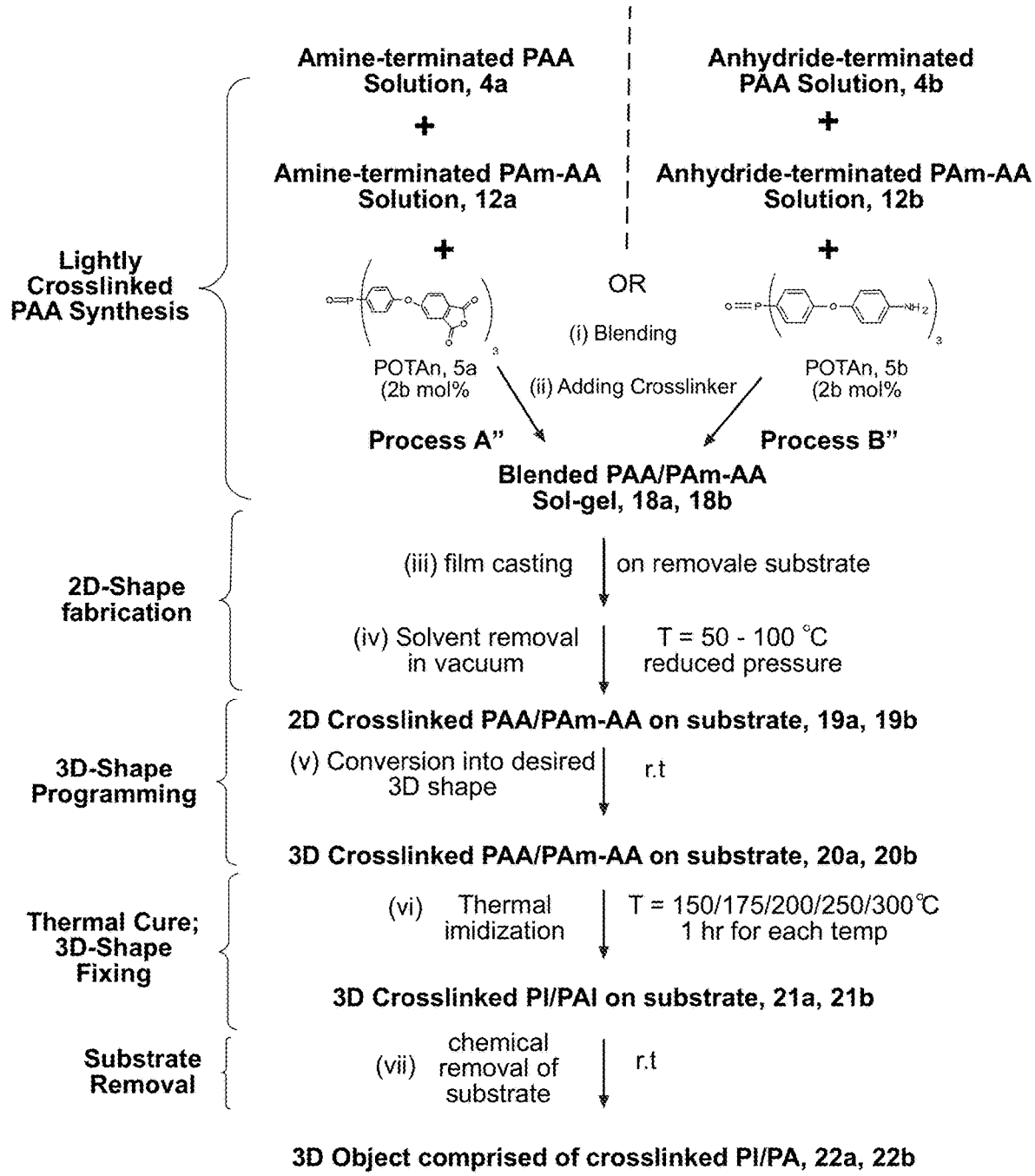
FIG. 3 is an exemplary scheme depicting the integrated process that combines the in-situ synthesis of a blend of lightly crosslinked poly(amic acid) (PAA) and poly(amide-amic acid) (PAm-AA), steps (i) blending-(ii) adding crosslinker, and fabrication of 3D object comprised of crosslinked polyimide/poly(amide-imide) (3D-XPI/XPAI): 2D (film) and 3D object fabrication, steps (iii)-(iv) and steps (v)-(vi), respectively, and removal of supporting substrate, step (vii). X denotes crosslinked. This example pertains to generation of either amine-terminated or anhydride-terminated polymer blend that reacts fully with stoichiometric amount of a trianhydride crosslinker (POTAn) or triamine crosslinker (POTAm), respectively.

Example 4 FIG. 3 illustrate the origami-inspired fabrication process for the crosslinked copolymer compositions of a polyimide and a poly(amide-imide) that are derived from blending of poly(amide-amic acid)/poly(amide-imide) (PAm-AA/PAI) using either a triphenylphosphine-based trianhydride (5a) or triamine (5b) as a crosslinker, respectively. When the trianhydride crosslinker (x mol %) is used (i.e. process A''), the amine-terminated PAA solution (4a) from Example 1 (FIG. 1A) and the amine-terminated PAm-AA solution (12a) from Example 2 (FIG. 2A) are blended, followed by the addition of appropriate amount of the trianhydride crosslinkers (2b mol % based on the stoichiometry depicted in FIGS. 1A and 2A). After the crosslinker had completely dissolved, the resulting blended PAA/PAm-AA sol-gel (18a) was immediately used in the fabrication of origami (3D) object as described in Example 4. Alternatively in the process B'', when a triamine crosslinker (5b) is used, anhydride-terminated PAA solution (4b) from Example 1 (FIG. 2B) and PAm-AA (12b) solution from Example 2 (FIG. 2B) are mixed, followed by addition of stoichiometrically balanced amount of the triamine crosslinker to result in the modified PAA/PAm-AA sol-gel (18b) for immediate used in the fabrication of an origami object as described in Example 4.

Figure 4:
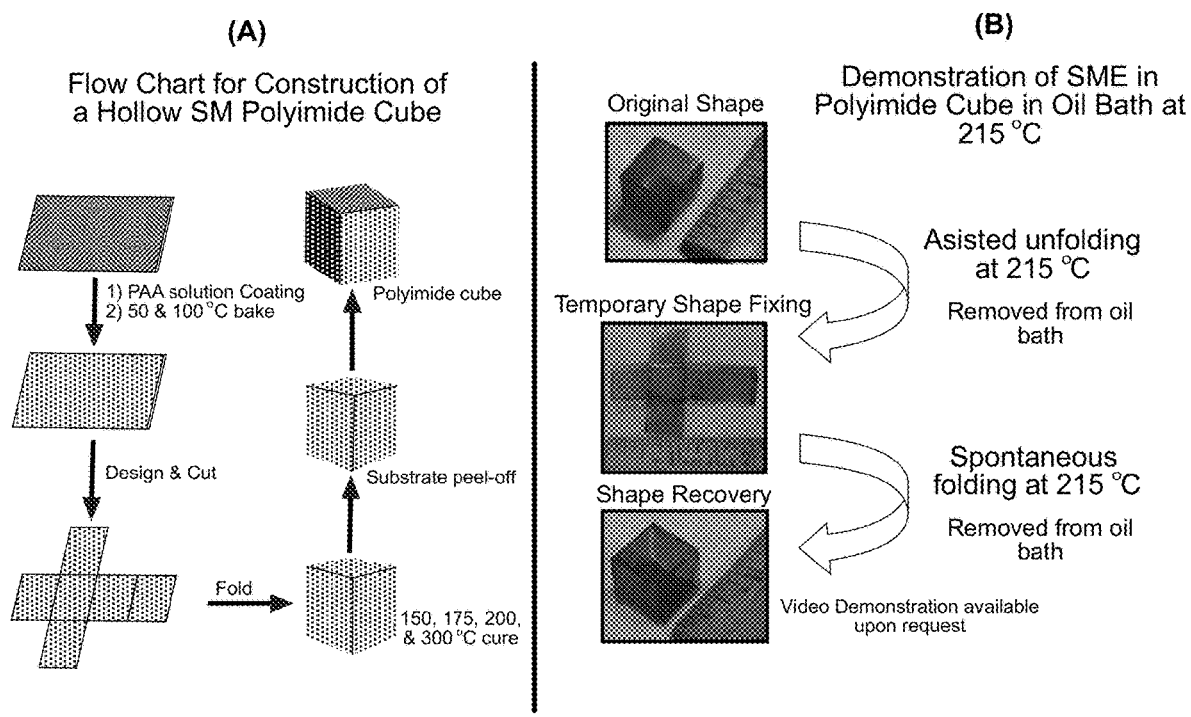
FIG. 4 illustrates a flow chart for the construction of a six-sided box via poly(amic acid)/crosslinking/polyimide processing chemistry, in accordance with another embodiment of the invention.

Example 5 Referring to FIG. 4, a flow chart for constructing a hollow shape memory polyimide cube is provided. The first step of the fabrication is to prepare the modified polymer intermediate solution (sol-gel), such as PAA (4a or 4b), PAm-AA (12a or 12b) and PAA/PAm-AA (18a or 18b), containing the requisite amount of an appropriate crosslinker as described above and shown in FIGS. 1A, 1B, 2A, 2B and 3. The second step entails pouring the viscous modified polymer intermediate sol-gel into a substrate (e.g. an aluminum dish). The third step pertains to evaporation of the solvent under reduced pressure and in temperature range where none or partial curing of PAA is taking place. For example, the substrate coated with the viscous modified polymer intermediate solution may be heated to a temperature from about 50° C. to about 100° C. under reduced pressure, such that only partial curing of modified polymer intermediate is taking place. However, use of lower temperatures (e.g., room temperature to about 50° C.) and lower pressures (e.g., less than about 200 torr or less than about 100 torr) may minimize or prevent excessive curing. Once the laminated substrate (i.e. 7a, 7b, 14a, 14b, 19a, 19b in FIGS. 1A, 1B, 2A, 2B and 3) is stable, the next step involves drawing the origami folding pattern on the aluminum side of the substrate and cut out the pattern with a pair of scissors. Manual folding sequence of the two-dimensional configuration of the origami object (8a, 8b, 15a, 15b, 20a, and 20b in FIGS. 1A, 1B, 2A, 2B and 3) at room temperature is then performed so that the aluminum substrate is on the outside to form a three-dimensional form. Following an imidization process, where a curing schedule for crosslinked polyimides (i.e. 9a, 9b, 16a, 16b, 21a, and 21b in FIGS. 1A, 1B, 2A, 2B and 3) is performed (e.g., sequential heating at about 150° C., about 175° C., about 200° C., about 250° C., and/or about 300° C.), the next step involves removal of the substrate. For example, aluminum can be dissolved easily in aqueous HCl. The resulting crosslinked polyimide hollow cube (i.e. 10a, 10b, 17a, 17b, 22a, and 22b in FIGS. 1A, 1B, 2A, 2B and 3) is shown in the top photo of FIG. 4.

Example 5 A qualitative shape-memory effect (SME) has been demonstrated by stretching the 2PEx-xCP2-Anb (x=2PE-ODA mol %; b=mol % POTAn trianhydride) polymer films in a 240° C. oil bath, and "freezing" the temporary shape at ambient temperature. The results indicate that both 2PE10-xCP2-An2, 2PE40-xCP2-An2, 2PE50-xCP2-An2 have retained similar shape-memory effect (SME) as xCP2-An2 (with 2 mol % POTAn, and 0 mol % 2PE-ODA) at glass-transition temperature below the onset temperature of PE crosslinking reaction (~290-300° C.). In addition, excellent SME could be demonstrated by having the 3D folded objects fabricated with 2PE40-xCP2-An2 (x=40=2PE-ODA mol %; b=2=mol % POTAn) placed in an oil bath at temperature range of 240° C., they can be readily unfolded and fixed in the 2D shapes under stress when cooled quickly to room.

Figure 5:
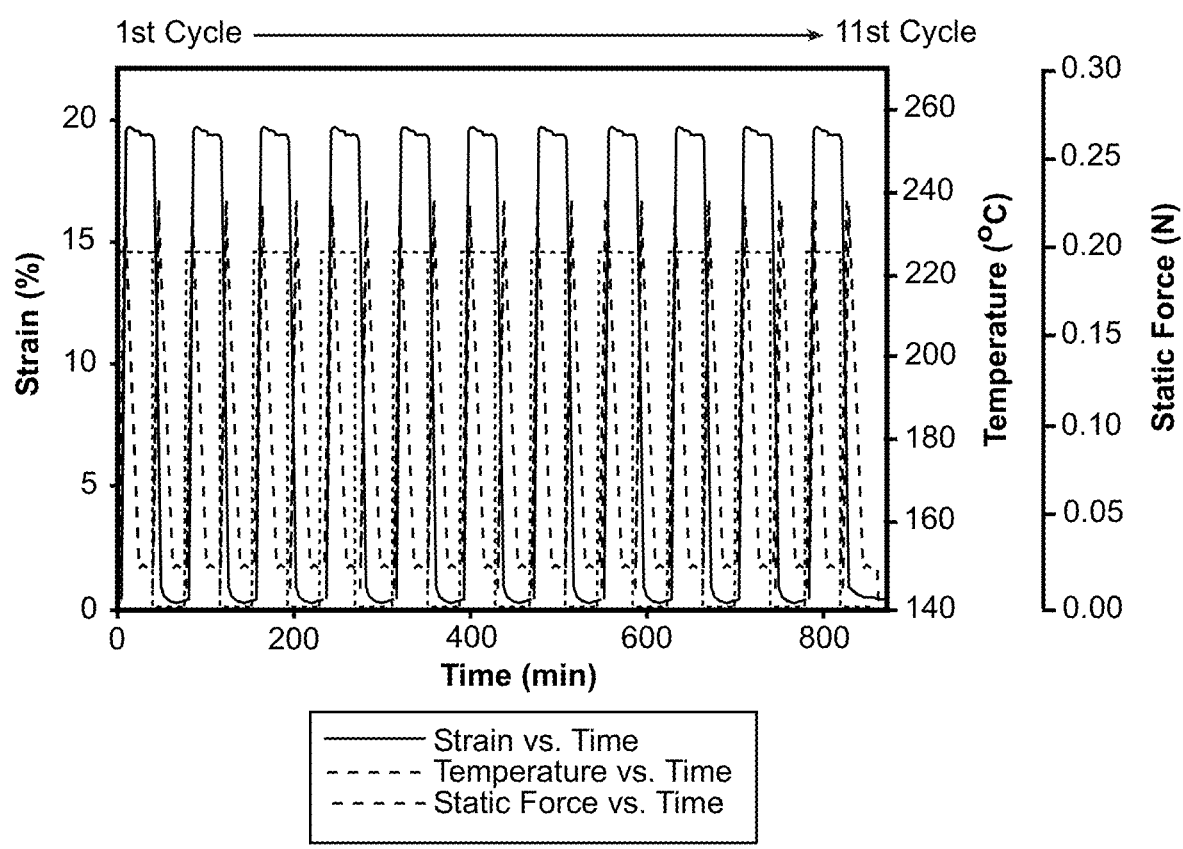
FIG. 5 is a two-dimensional plot of Strain (%), Static Force (N), and Temperature (° C.) versus time showing data from a demonstration of change of strain, stress, with temperature and time on a dynamic mechanical analyzer (DMA) using a sample film of 2PE40-XCP2-An2, which was processed in accordance with an embodiment of the present invention. X denotes crosslinked. The shape memory performance was evaluated by 11 stress-strain-temperature (SST) cycles at 240° C. (~13° C. above the initial glass transition temperatures (~227° C.) but below the typical onset temperature observed for the thermal curing of phenylethynyl thermosetting polymers) was used as the triggering temperature.

Example 6 Dynamic mechanical analysis (DMA) is a standard method to evaluate the shape-memory effect by subjecting a polymer film speciment to many cycles of stress-strain-temperature (SST) testing at a selected temperature and constant static force. Referring to FIG. 5, DMA experiment was conducted for the film of a 2PE-containing, POTAn-crosslinked co-polyimide, 2PE40-xCP2-An2; (40 mol % 2PE-ODA; 2 mol % POTAn) was evaluated at 240° C., to avoid the premature occurrence of PE crosslinking reaction with typical onset temperature around 300° C. The strains (~19.6%) are almost unchanged in 11 SST testing cycles. The films showed excellent shape memory fixity (98.6%) and recovery (100%). See Table 3 below.

TABLE 3

Strain, Shape Memory Fixity and Shape Memory Recovery of 2PE-containing, POTAn-crosslinked co-polyimide, 2PE40-xCP2-An2; (40 mol % 2PE-ODA; 2 mol % POTAn) after being stretched between 150-240° C. (DMA) for 11 cycles.

| Cycle No. | Strain (%) | Shape Memory Fixity,[a] $R_f$ % | Shape Memory Recovery,[b] $R_f$ % |
|---|---|---|---|
| 1 | 19.74 | 98.4 | 100 |
| 2 | 19.68 | 98.5 | 100 |
| 3 | 19.68 | 98.6 | 100 |
| 4 | 19.67 | 98.4 | 100 |
| 5 | 19.68 | 98.5 | 100 |
| 6 | 19.64 | 98.6 | 100 |
| 7 | 19.64 | 98.5 | 100 |
| 8 | 19.58 | 98.7 | 100 |
| 9 | 19.56 | 98.5 | 100 |
| 10 | 19.54 | 98.6 | 100 |
| 11 | 19.52 | 98.6 | 100 | a. a. The shape fixity of the Nth cycle,
$$R_f(N) = \frac{S_{u_\varepsilon}}{S_{in_\varepsilon}(N)} \times 100\%$$
is defined as the ratio between the "programming" defomation at $T > T_g$ and the deformation remaining upon removal of the constraint at $T < T_g$ (i.e. a stress free state). Here $\varepsilon_u$ is the strain after removal of the tensile stress and $\varepsilon_m$ is the maximum applied strain in the programming step.

b. b. The shape recovery of the Nth cycle,
$$R_r(N) = \frac{S_{u_\varepsilon}(N) - S_{p_\varepsilon}(N)}{S_{u_\varepsilon}(N) - S_{p_\varepsilon}(N-1)} \times 100\%,$$
quantifies how well the permanent shape has been memorized. Here, $\varepsilon_p$ is the residual strain after the stress has been removed from the sample in the recovery cycle.

Figure 6:
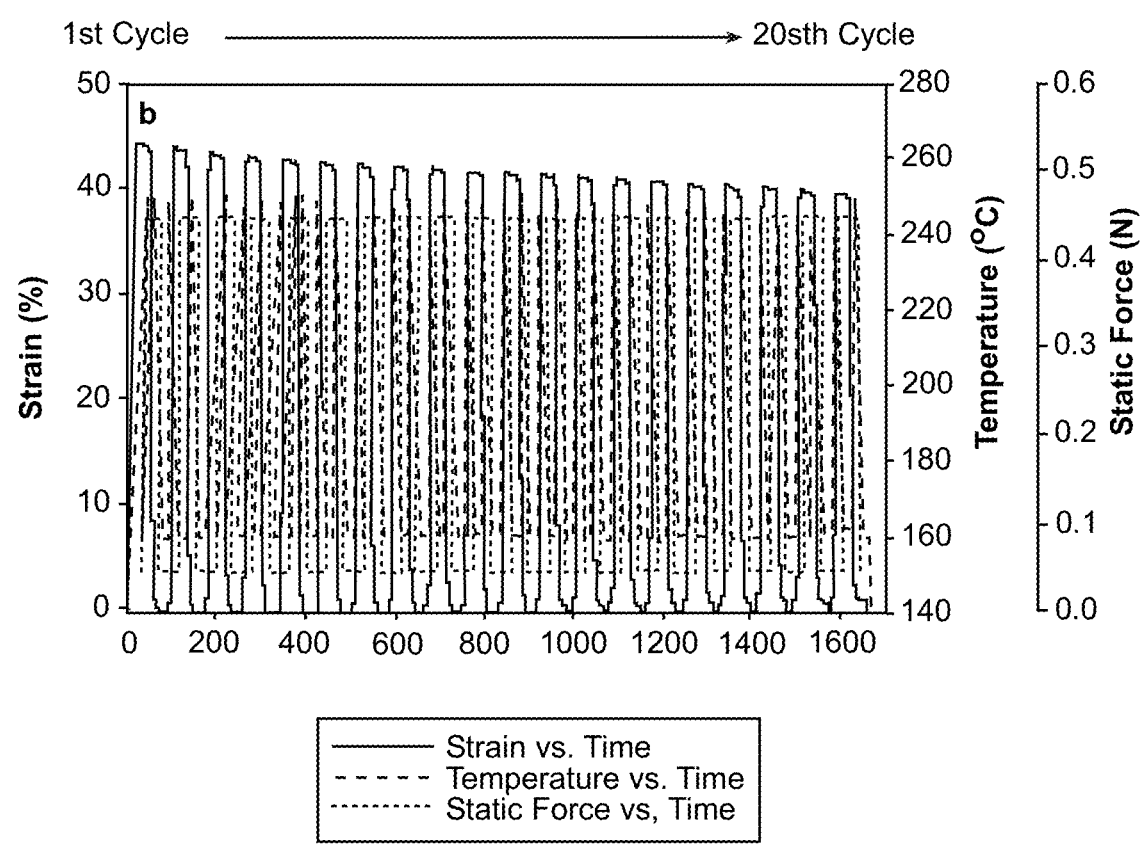
FIG. 6 is a two-dimensional plot of Strain (%), Static Force (N), and Temperature (° C.) versus time showing data from a demonstration of change of strain, stress, with temperature and time of the same sample film of PE25-XCP2-Am5 on a dynamic mechanical analyzer (DMA). The shape memory performance was evaluated by 22 stress-strain-temperature (SST) cycles at 250° C. (~23° C. above the initial glass transition temperatures (~227° C.) was used as the triggering temperature. X denotes crosslinked. Slow crosslinking of 2PE moieties appears to significantly affecting the shape-memory properties as evidenced by the degrading elasticity at this temperature.

Example 7 Referring to FIG. 6, the two-dimensional shape memory behavior of a 2PE-containing, POTAn-crosslinked copolyimide, 2PE40-xCP2-An2; (40 mol % 2PE-ODA; 2 mol % POTAn) where the temperature well above glass-transition was used as the triggering temperature was evaluated by DMA. The films were subjected to 20 testing cycles. As shown in FIG. 6, at 260° C. at which the PE crosslinking chemistry is slowly taking place, the shape memory effect and elasticity are apparently degrading at this temperature as the $T_g$ and modulus are progressively increasing. In other words, the deployed origami object is becoming less elastomeric, and behaving like a more dimensionally stable thermoplastic object as long as the temperature of the hot environment does not exceed the $T_g$ advanced by the crosslinking chemistry of phenylethynyl (PE) pendants. Their shape memory fixity is in the range of 98.5-98.6% and recovery is 100%. The loss of 1.5% shape fixity is likely attributed to the film shrinkage during cooling cycles (240 to 150° C.).

TABLE 4

Strain, Shape Memory Fixity and Shape Memory Recovery of 2PE-containing, POTAn-crosslinked co-polyimide, 2PE40-xCP2-An2; (40 mol % 2PE-ODA; 2 mol % POTAn) after being stretched between 160-250° C. (DMA) for 20 cycles.

| Cycle No. | Strain (%) | Shape Memory Fixity,[a] $R_f$ % | Shape Memory Recovery,[b] $R_f$ % |
|---|---|---|---|
| 1 | 44.42 | 99.5 | 100 |
| 2 | 43.82 | 99.5 | 100 |
| 3 | 43.36 | 99.4 | 100 |
| 4 | 43.07 | 99.5 | 100 |
| 5 | 42.75 | 99.6 | 100 |
| 6 | 42.48 | 99.5 | 100 |
| 7 | 42.27 | 99.5 | 100 |
| 8 | 42.07 | 99.4 | 100 |
| 9 | 41.85 | 99.5 | 100 |
| 10 | 41.70 | 99.5 | 100 |
| 11 | 41.50 | 99.6 | 100 |
| 12 | 41.35 | 99.5 | 100 |
| 13 | 41.18 | 99.5 | 100 |
| 14 | 40.97 | 99.5 | 100 |
| 15 | 40.80 | 99.6 | 100 |
| 16 | 40.33 | 99.5 | 100 |
| 17 | 40.20 | 99.5 | 100 |
| 18 | 40.15 | 99.4 | 100 |
| 19 | 39.80 | 99.5 | 100 |
| 20 | 39.54 | 99.5 | 100 | a. The shape fixity of the Nth cycle,
$$R_f(N) = \frac{S_{u_\varepsilon}}{S_{in_\varepsilon}(N)} \times 100\%$$
is defined as the ratio between the "programming" defomation at $T > T_g$ and the deformation remaining upon removal of the constraint at $T < T_g$ (i.e. a stress free state). Here $\varepsilon_u$ is the strain after removal of the tensile stress and $\varepsilon_m$ is the maximum applied strain in the programming step.

b. The shape recovery of the Nth cycle,
$$R_r(N) = \frac{S_{u_\varepsilon}(N) - S_{p_\varepsilon}(N)}{S_{u_\varepsilon}(N) - S_{p_\varepsilon}(N-1)} \times 100\%,$$
quantifies how well the permanent shape has been memorized. Here, $\varepsilon_p$ is the residual strain after the stress has been removed from the sample in the recovery cycle.

Figure 7:
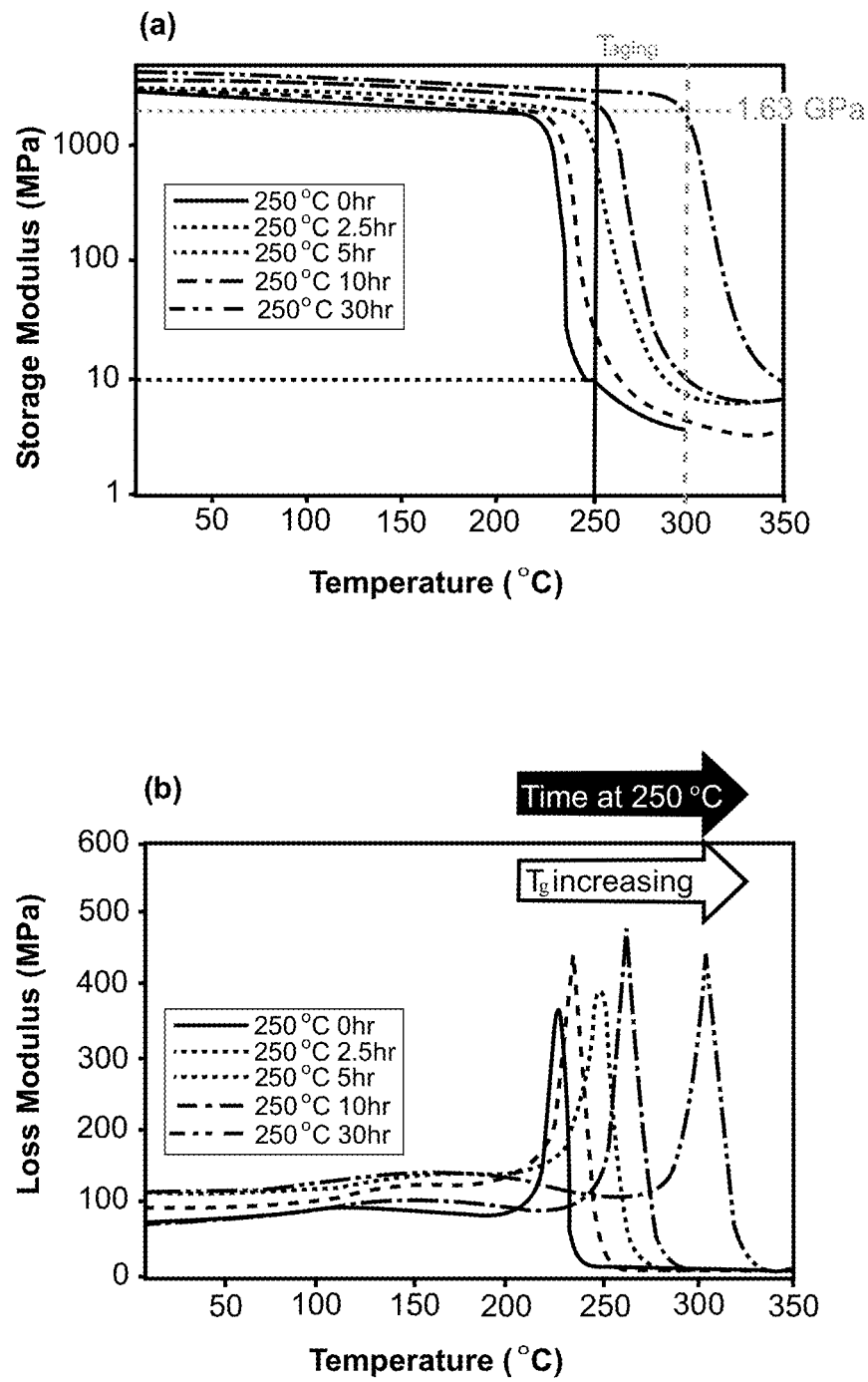
FIG. 7 depicts DMA plots for polyimide film that was isothermally aged at 250° C. (oven) for 0, 2.5, 5, 10 and 30 hr. (a) "Storage Modulus, E' versus Temperature" plot: Before isothermal aging, the storage modulus of 2PE40-XCP2-An2 is ~10 MPa at 250° C. X denotes crosslinked. After 30 h at 250° C., its modulus is ca. 130× greater at 300° C. Note the Y-axis is log scale. (b) "Loss Modulus, E" versus Temperature" plot: In parallel, its $T_g$ increases by ca, 97° C. from 227° C. to 304° C.
Figure 8:
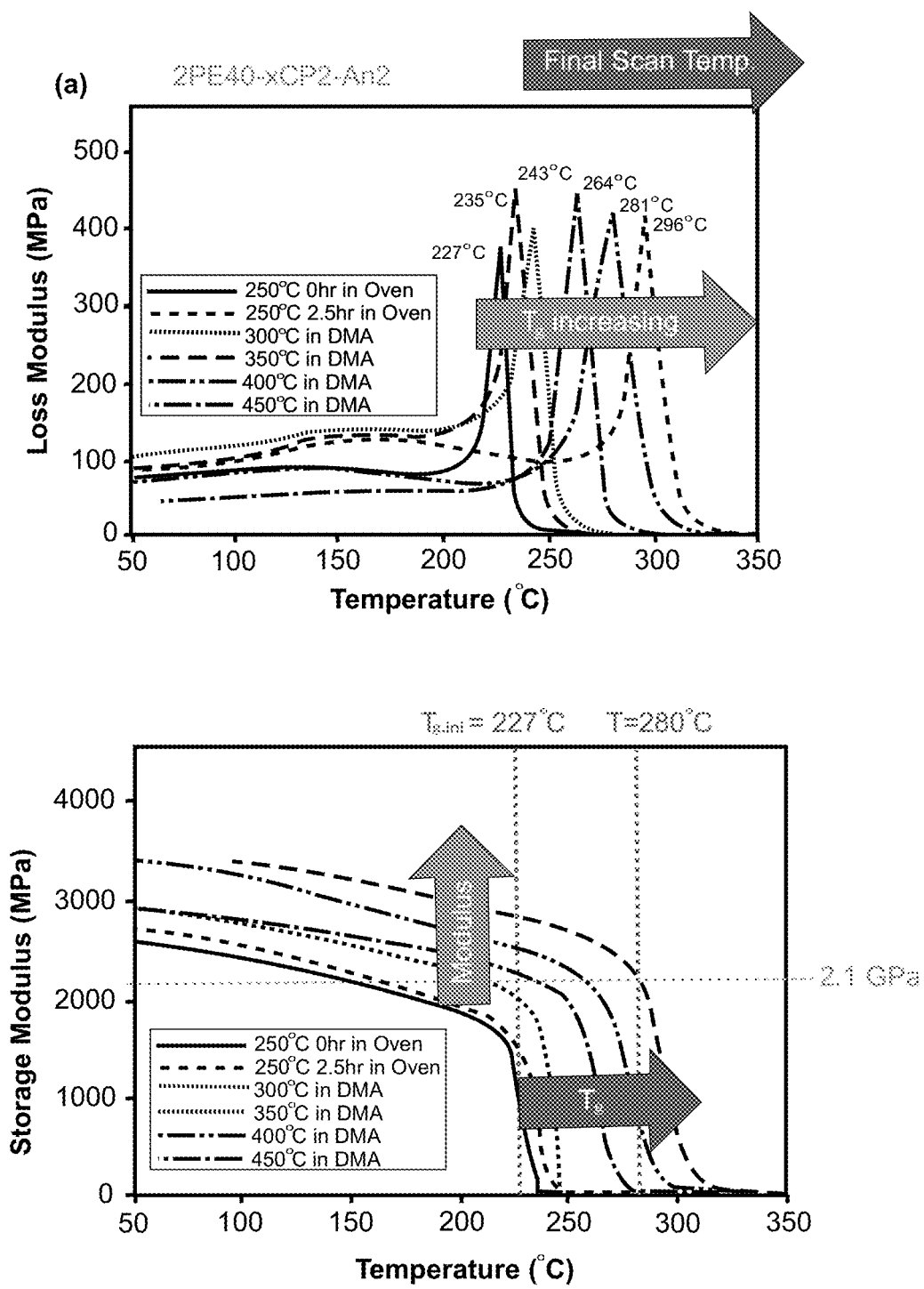
FIG. 8 depicts comparative DMA plots of 2PE40-XCP2-An2 ($T_{g,ini}$=227° C.) films (6 samples) that were subjected to slower (oven) and accelerated (DMA condition) thermal curing of PE groups in 2PE40-XCP2-An2. X denotes crosslinked. The DMA scanning rate was 10° C./min. For example, plot (a) depicts only 8° C. increase in $T_g$ after 150 min at 250° C. (oven), whereas a $T_g$ increase of ~70° C. was achieved upon rapidly ramping up the temperature from 250° C. to 450° C. in 40 min, indicating high degree of PE crosslinking reaction is feasible. In parallel, the storage modulus depicts in plot (b) is >2 GPa at 280° C. [Note the log scale for the modulus axis in plot (b)]

Example 8 Referring to FIGS. 7 and 8, an important and unique feature of the present invention is to provide the new materials to enable (i) as-fabricated, 3D shape of the object to be permanently stable at temperatures near or above the initial glass-transition, up to $T_{g,ini}+100°$ C., and (ii) structural tuning in relation to the initial $T_{g,ini}$ for temperature flexibility in converting 3D permanent shape to 2D temporary shape. This capability is absent in the traditional heat-induced shape-memory polymers. Similar to traditional thermally shape-memorized polymers, a 2D shape or other 3D shapes can be temporarily fabricated when the initially fabricated 3D object is heated to temperatures in the vicinity of glass transition and rapidly cooled to room temperature with the desired shape held under strain. The temporary 2D or 3D shape of the fabricated polymer object will spontaneously return to the original 3D shape at temperatures in the vicinity of the initial glass transition. The original 3D shape of the object persists for a long time at any temperature near the polymer glass-transition temperature but well below the new glass-transition and decomposition temperatures. More importantly, the degree of dimensional stability increases with time as the imbedded phenylethynyl pendants starts and continues to crosslink resulting in the concomitant increase in $T_g$ and modulus. This capability in the subject 2PEx-xCP2 polyimide films is exemplified by examining the thermomechanical behavior of 2PE40-xCP2-An2, i.e. xCP2 polyimide that contains 40 mol % of 2PE-ODA and crosslinked with 2 mol % of phosphine oxide trianhydride, under (a) the isothermal condition of $\sim T_g+50°$ C., and (b) sequentially increase in temperature beyond $T_g+50°$ C. The evaluation was conducted by dynamic (thermo) mechanical analysis (DMA) and the results are depicted in FIG. 7. The as-prepared 2PE40-xCP2-An2 polyimide has an initial glass transition temperature ($T_{g,ini}$) of 227° C. This is about 92° C. lower than the commonly observed onset temperature of PE reaction exotherm detected on DSC scans and reported in Table 5. Therefore, the isothermal aging temperature was set at 250° C. Before isothermal aging in a 250° C. oven, the storage modulus of 2PE40-xCP2-An2 is ~10 MPa at 250° C. After 30 h at 250° C., its modulus is ca. 130× greater at 300° C. (b) In parallel, its $T_g$ increases from 227° C. to 304° C., i.e. by ca, 97° C. In other words, the results indicate that the 3D object of 2PE40-xCP2-An2 polyimide is no longer an elastomer, but is now a high-temperature glassy polymer.

TABLE 5

Polyimide compositions and film thermal properties of linear CP2, xCP2-An2, 2PEX-xCP2-Amb (2 mol % POTAn; X = 10, 40 or 50 mol % of 2PE-ODA) and 2PE100-x0DA/2PE-ODA-Am2 (2 mol % POTAn; X = 100 mol % of 2PE-ODA and 100 mol % of oxy-4,4'-di(phthalic anhydride) samples according to DSC results

| Sample | 6FDA (mol %) | APB (mol %) | 2PE-ODA (mol %) | $T_{g,1}^a$ (° C.) | $T_{g,2}^b$ (° C.) | $T_{onset}^c$ (° C.) | $T_p^d$ (° C.) | ΔH (J/g)$^e$ |
|---|---|---|---|---|---|---|---|---|
| Linear CP2 | 100 | 100 | 0 | 205 | 205 | — | — | — |
| xCP2-An2$^a$ | 97 | 100 | 0 | 209 | 210 | — | — | — |
| 2PE10-xCP2-An2 | 97 | 90 | 10 | 205 | 218 | 339 | 383 | 13.3 |
| 2PE40-xCP2-An2 | 97 | 60 | 40 | 214 | 262 | 319 | 371 | 107 |
| 2PE50-xCP2-An2 | 97 | 50 | 50 | 216 | 280 | 317 | 368 | 144 |
| PE100-xOPDA/2PE-ODA-An2 | 97 (OPDA) | 0 | 100 | 217 | >450 | 304 | 352 | 297 |

Notes:
$^a$$T_g$ measured from the inflection points of first DSC heating scan at 10° C./min;
$^b$Initial $T_g$ measured from the inflection points of second DSC heating scan at 10° C./min;
$^c$The intersection of the tangents of the peak with the extrapolated baseline;
$^d$PE exothermal peak during first DSC heating scan;
$^e$PE exothermal enthalpy during first DSC heating scan.

Example 9 Referring to FIG. 8, the rate and extent of PE crosslinking reaction (curing) under thermally dynamic conditions with the thermally static (isothermal) condition were assessed by dynamic mechanical analysis (DMA). This comparative DMA experiment was conducted for six 2PE40-xCP2-An2 samples. The as-prepared 2PE40-xCP2-An2 polyimide film sample and a different sample had been aged at 250° C. for 2.5 hr were subjected to DMA scan from 50° C. to 260° C. The other four as-prepared 2PE40-xCP2-An2 samples were subjected to DMA scanning from 50° C. to 300° C., 350° C., 400° C., and 450° C. As expected, the storage modulus and $T_g$ were both increased accordingly (FIG. 8). In addition, comparative DMA results of 2PE40-xCP2-An2 ($T_{g,ini}$=227° C.) films confirm the different outcomes between the slower (oven) and accelerated (DMA condition) thermal curing of PE groups in 2PE40-xCP2-An2. For example, given that the DMA scanning rate was 10° C./min, only 8° C. increase in $T_g$ after 150 min at 250° C. (oven), whereas a $T_g$ increase of ~70° C. was achieved upon rapid ramping up the temperature from 250° C. to 450° C. in 40 min, indicating that high degree of PE crosslinking reaction is feasible. In parallel, the storage modulus is >2 GPa can be achieved at 280° C.

Example 10. Synthesis of 4,4'-oxybis(3-(phenylethynyl) aniline), 2PE-ODA (a) 2,2'-diiodo-4,4'-dinitrodiphenyl ether. To a 1 L three-necked reaction flask, equipped with mechanical stir, 400 mL 95-98% sulfuric acid and 10.76 g (50.5 mmol) sodium periodate were charged. To the suspension, 25.15 g (151.5 mmol) potassium iodide was added within 1 hour. The mixture was stirred at room temperature for additional 1 hour. This mixture was slowly added to a separately prepared suspension of 26.02 g (0.100 mol) 4,4'-dinitrodiphenylether in 200 mL 95% sulfuric acid within one hour. The mixture was stirred for 3 hours, then, poured into ice water. The precipitate was collected via filtration, washed several times with water, then 300 mL ethanol, air-dried (with suction) to afford crude product. The crude product was further purified by recrystallization from toluene/heptane mixture. Two crops of crystals were collected: (i) 27.2 grams, m.p. 171.6-174.6° C., 53% isolated yield; (ii) 10.7 grams, m.p. 170.5-171.5° C., 27.7% additional isolated yield. $^1$H NMR (400 MHz, CDCl$_3$) δ=8.02-8.08 (d, J=4.8 Hz, 2H), 8.23-8.26 (dd, J=4.8, 8.8 Hz, 2H), 6.90-6.92 (d, J=8.8 Hz, 2H). Elemental analysis calculated for C$_{12}$H$_6$I$_2$N$_2$O$_5$ (%): C, 28.15; H, 1.18; N, 5.47; O, 15.62. Found (%): C, 28.06; H, 1.14; N, 5.16; 0, 15.78.

(b) 2,2'-bis(phenylethynyl)-4,4'-dinitrodiphenylether. To a 500 mL round-bottomed flask, equipped with a stir bar, and a nitrogen inlet, 25.60 g (50.0 mmol) 2,2'-diiodo-4,4'-dinitrodiphenylether, 47.6 mg (0.250 mmol) copper iodide and 350.9 mg (0.500 mmol) bis(triphenylphosphine)palladium chloride were charged. After three cycles of vacuuming and back-filing with nitrogen, 20.43 g (200 mmol) phenylacetylene, 25 ml trimethylamine and 100 mL acetonitrile were charged. The resulting mixture was stirred at room temperature for 4 hours, and the organic solvents were removed by rotary evaporation. The remaining solids were washed on a filter funnel with water, 90 mL ethanol (3×) and air dried (with suction). The solids were dissolved in hot toluene, 2 grams activated carbon black was added, then the resulting mixture was filtrated. The crude product obtained after rotary evaporation of the filtrate was further purified by recrystallization from toluene twice to give 15.38 grams of light yellow crystals, m.p. 180.5-181.9° C., 66.7% isolated yield. Additional 1.05 grams (m.p. 178.7-180.7° C., 4.6% additional isolated yield) was obtained as second crop of product. $^1$H NMR (400 MHz, CDCl$_3$) δ=8.49-8.50 (d, J=2.8 Hz, 2H), 8.18-8.21 (dd, J=2.8, 8.8 Hz, 2H), 7.30-7.42 (m, 10H), 7.09-7.11 (d, J=8.8 Hz, 2H). Elemental analysis calculated for C$_{28}$H$_{16}$N$_2$O$_5$ (%): C, 73.04; H, 3.50; N, 6.08; O, 17.37. Found (%): C, 73.03; H, 3.47; N, 6.20; O, 17.33.

(c) 4,4'-oxybis(3-(phenylethynyl)aniline) (2PE-ODA). To a 300 mL round-bottomed flask, equipped with a nitrogen inlet, a stir bar, and a condenser, 15.19 g (30.00 mmol) 2,2'-bis(phenylethynyl)-4,4'-dinitrodiphenylether and 44.66 g (198.00 mmol) stannous chloride were charged. After three cycles of vacuuming and back-filling with nitrogen, 150 mL ethanol was added. The resulting mixture was heated to 80° C., and held at that temperature for 3 hours. After the reaction mixture was allowed to cool to room temperature, ethanol was removed under vacuum, then the residual semi-solids were rinsed out with water into a solution of 31.68 grams of sodium hydroxide in 620 mL water. The mixture was stirred for 30 minutes, and extracted with 200 mL ethyl acetate (3×). The combined organic solution was washed with de-ionized water, for three times, then dried over anhydrous sodium sulfate. The organic solution was filtrated through a plug of silica gel, then, concentrated on a rotary evaporator to give the crude product as a yellowish viscous oil. The oil was further purified by recrystallization from toluene three times to obtain 4.18 g of slightly yellow crystals, m.p. 141.7-142.7° C., 31.6% isolated yield. $^1$H NMR (400 MHz, CDCl$_3$) δ=7.43-7.45 (m, 4H), 7.24-7.26 (m, 6H), 6.88 (d, J=2.8 Hz, 2H), 6.76-6.79 (d, J=8.8 Hz, 2H), 6.58-6.61 (dd, J=2.8, 8.8 Hz, 2H), 3.52 (brs, 4H). IR (cm$^{-1}$): 3433, 3412, 3355, 3330, 3211, 2208, 1607, 1496, 1480, 1435, 1261, 1218, 856, 818, 753, 687, 593, 531, 462. Elemental analysis calculated for $C_{28}H_{20}N_2O$ (%). C, 83.98; H, 5.03; N, 7.00; O, 4.00. Found (%): C, 83.63; H, 4.98; N, 6.95; 0, 4.05. ESI-MS: m/z 401.2 [(M+.H)$^+$]

Example 11. Synthesis of Phosphine-Oxide Triamine (a) The following is an exemplary procedure for the synthesis of tris(4-methoxyphenyl)phosphine oxide (TMPO). Into a 100 mL three-necked flask equipped with a magnetic stir bar and nitrogen inlet and outlet were placed tris(4-methoxyphenyl)phosphine (TMP) (3.0 g, 8.5 mmol) and acetone (30 mL). A mixture of water (2 mL) and $H_2O_2$ (35%, 1 mL, 9 mmol) was added slowly. After the mixture had been stirred at room temperature for 1 hour, the acetone was evaporated, and methylene chloride (50 mL) was added. The organic phase was washed with a saturated NaCl solution (35 mL) three times with the aid of a separatory funnel. The organic layer was then dried over anhydrous sodium sulfate. Finally, the solvent was removed via rotary evaporation to afford 3.0 g (95%) of a white solid, m.p. 144.7-145.4° C. MS (m/e): 368 (M$^+$). Anal. Calcd. for $C_{21}H_{21}O_4P$: C, 68.47%; H, 5.75%; P, 8.41%. Found: C, 68.42%; H, 5.72%; P, 8.11%. FT-IR (KBr, cm$^{-1}$): 3068, 3026, 2959, 2837, 1597, 1569, 1503, 1468, 1289, 1254, 1179, 1121, 1019, 803, 671, 543. $^1$H-NMR (CDCl$_3$, δ in ppm): 3.84 (s, 6H, CH$_3$), 6.94-6.97 (dd, 6H, Ar—H), 7.54-7.60 (dd, 6H, Ar—H). 13C-NMR (DMSO-d$_6$, δ in ppm): 55.29, 114.08, 114.21, 124.19, 125.28, 133.21, 133.32, 161.79, 161.82.

(b) The following is an exemplary procedure for the synthesis of tris(4-hydroxyphenyl)phosphine oxide (THPO) via demethylation of TMPO. Into a 500 mL three-necked flask equipped with a magnetic stir bar and nitrogen inlet and outlet were placed TMPO (25.0 g, 67.9 mmol) and pyridine hydrochloride (250 g) at 210° C. for 2 hours. The light brown solution was poured into water while it was still hot. The white precipitate was collected and recrystallized from ethyl acetate to afford 21.0 g (95%) of white crystals, m.p. 274.8-276.8° C. MS (m/e): 326 (M$^+$). FT-IR (KBr, cm$^{-1}$): 3380, 1601, 1581, 1505, 1436, 1278, 1175, 1119, 1068, 831, 677, 537. 1H-NMR (DMSO-d$_6$, δ in ppm): 6.86-6.89 (dd, 6H, Ar—H), 7.32-7.38 (dd, 6H, Ar—H), 10.14 (s, 3H, OH). $^{13}$C-NMR (DMSO-d$_6$, δ in ppm): 115.32, 115.45, 122.59, 123.69, 133.29, 133.40, 160.28, 160.30.

(c) The following is an exemplary procedure for the synthesis of tris[(4-nitrophenoxy)phenyl]phosphine oxide (TNPO). Into a 250 mL three-necked flask equipped with a magnetic stir bar and nitrogen inlet and outlet were placed THPO (7.52 g, 20.0 mmol), 1-fluoro-4-nitrobenzene (II) (9.32 g, 66.0 mmol), potassium carbonate (9.14 g, 66.0 mmol), and DMF (100 mL) at 100° C. for 48 hours. The mixture was allowed to cool to room temperature and filtered. The filtrate was poured into water, and the precipitate was extracted with ethyl acetate (300 mL) three times with the aid of a separatory funnel. The combined organic extract was concentrated under vacuum, and 13.3 g (97%) of yellow crystals that were formed during the concentrating process was collected by filtration, m.p. 205.0-206.6° C. MS (m/e): 689 (M+). FT-IR (KBr, cm$^{-1}$): 3071, 1612, 1585, 1523, 1487, 1345, 1242, 1176, 1116, 879, 866, 831, 788, 696, 556. 1H-NMR (DMSO-d$_6$, δ in ppm): 7.27-7.31 (d, 6H, Ar—H), 7.35-7.37 (d, 6H, Ar—H), 7.75-7.80 (m, 6H, Ar—H), 8.27-8.31 (d, 6H, Ar—H). 13C-NMR (DMSO-d$_6$, δ in ppm):118.84, 119.82, 119.94, 126.22, 128.18, 129.23, 134.09, 134.20, 143.09, 157.93, 157.96, 161.29.

(d) The following is an exemplary procedure for the synthesis of another exemplary triamine crosslinker tris[(4-aminophenoxy)phenyl]phosphine oxide (TAPO) having the general structure A where W is P=O (IUPAC name 4,4', 4"-(4,4',4"-phosphinetriyltris(benzene-4,1-diyl)tris(oxy))trianiline) by reduction of TNPO via catalytic hydrogenation as depicted in FIG. 4. TNPO (8.0 g, 11.6 mmol), DMF (120 mL), and 5% palladium on activated carbon (0.50 g) were added to a hydrogenation bottle. The bottle was secured on a Parr hydrogenation apparatus, flushed three times with hydrogen, and then pressurized to 60 psi. After the mixture had been agitated at room temperature for 24 hours under hydrogen pressure of 60 psi, it was filtered through a cake of Celite. The filter cake was washed with DMF. The filtrate was then poured into water to precipitate a white solid that was subsequently recrystallized from ethanol/water to afford 6.41 g (98%) of white crystal, m.p. 211.1-211.5° C. MS (m/e): 559 (M$^+$). Anal. Calcd. for C36H30N3O4P: C, 72.11%; H, 5.04%; N, 7.01%. Found: C, 72.01%; H, 4.97%; N, 6.91%. FT-IR (KBr, cm$^{-1}$): 3437, 3328, 3210, 3042, 1592, 1507, 1493, 1242, 1197, 1165, 1117, 871, 830, 671, 577. 1H-NMR (DMSO-d$_6$, δ in ppm): 5.06 (s, 6H, NH2), 6.59-6.62 (d, 6H, Ar—H), 6.79-6.81 (d, 6H, Ar—H), 6.94-6.96 (d, 6H, Ar—H), 7.48-7.53 (d, 6H, Ar—H). $^{13}$C-NMR (DMSO-d$_6$, δ in ppm): 114.85, 115.89, 116.01, 121.34, 125.06, 126.13, 133.40, 133.51, 144.11, 146.13, 162.89, 161.92.

Example 12 Phosphine-Oxide Trianhydride

The synthesis of an isomer of triphenylphosphine oxide trianhydride is accomplished in 5-steps starting from commercially available tris(4-methoxyphenyl)phosphine oxide and experimental details are provided as examples. Briefly, tris(4-methoxyphenyl)phosphine was oxidized to tris(4-methoxyphenyl)phosphine oxide. In a previously reported work, BBr$_3$ was used to demethylate compound 13. However, we found demethylation with pyridine hydrochloride above its melting point was more effective and cleaner. Nucleophilic substitution reaction of the resulting tris(4-hydroxyphenyl)phosphine oxide with 4-nitrphthalonitrile after deprotonation in situ by potassium carbonate) in DMF afforded the corresponding tris(ether-dinitrile) compound, namely tris[4-(3,4-dicyanophenoxy)phenyl]phosphine oxide, which, upon subsequent alkaline hydrolysis was converted to the corresponding tris(ether diacid), which was then cyclodehydrated to produce the desired trianhydride monomer.

(a) Tris(4-methoxyphenyl)phosphine Oxide. Into a 100 mL three-necked flask equipped with a magnetic stir bar and nitrogen inlet and outlet were placed tris(4-methoxyphenyl) phosphine (3.0 g, 8.5 mmol) and acetone (30 mL). A mixture of water (2 mL) and H$_2$O$_2$ (35%, 1 mL, 9 mmol) was added slowly. After the mixture was stirred at room temperature for 1 h, acetone was evaporated and methylene chloride (50 mL) was added. The organic phase was washed with a saturated NaCl solution (35 mL) three times. The organic layer was dried over sodium sulfate. The solvent was removed under vacuum to afford 3.0 g (95%) of a white solid, m.p. 144.7-145.4° C. (lit. 143-144° C.). MS (m/e): 368 (M$^+$). Anal. Calcd. for $C_{21}H_{21}O_4P$: C, 68.47%; H, 5.75%; P, 8.41%. Found: C, 68.42%; H, 5.72%; P, 8.11%. FT-IR (KBr, cm$^{-1}$): 3068, 3026, 2959, 2837, 1597, 1569, 1503, 1468, 1289, 1254, 1179, 1121, 1019, 803, 671, 543. $^1$H-NMR (CDCl$_3$, δ in ppm): 3.84 (s, 6H, CH$_3$), 6.94-6.97 (dd, 6H, Ar—H), 7.54-7.60 (dd, 6H, Ar—H). $^{13}$C-NMR (DMSO-d$_6$, δ in ppm): 55.29, 114.08, 114.21, 124.19, 125.28, 133.21, 133.32, 161.79, 161.822

(b) Tris(4-hydroxyphenyl)phosphine Oxide. Into a 500 mL 3-neck round bottom flask equipped with stir bar, nitrogen inlet and condenser was charged tris(4-methoxyphenyl) phosphine oxide (25.0 g, 67.9 mmol) followed by pyridine hydrochloride (250 g). The mixture was heated to 210° C. for 2 hours and allowed to cool to about 100° C. It was poured into water to afford 21.0 g (95.0%) of white crystals. m.p.: 274.8-276.8° C. (lit. 275-276° C.). [6] The product was used without further purification. Anal. Calcd. for C$_{18}$H$_{15}$O$_4$P: C, 66.26%; H, 4.63%; P, 9.49%; Found: C, 65.72%; H, 4.68%; P, 9.59%. $^1$H-NMR (DMSO-d$_6$, δ in ppm): 6.84-6.86 (dd, 6H, Ar—H), 7.30-7.45 (dd, 6H, Ar—H), 10.07 (s, 3H, Ar—O—H). $^{13}$C-NMR (DMSO-d$_6$, δ in ppm): 115.32, 115.45, 122.59, 123.69, 133.29, 133.40, 160.28, 160.30.

(c) Tris[4-(4-nitrophenoxy)phenyl]phosphine Oxide. Into a 500 mL 3-neck round bottom flask equipped with stir bar, condenser, and nitrogen inlet were charged tris(4-hydroxyphenyl)phosphine oxide (6.52 g, 20.0 mmol), 1-Fluoro-4-nitrobenzene (9.32 g, 66 mmol), potassium carbonate (9.14 g, 66.0 mmol) and N,N-dimethylformamide (DMF, 100 mL). The mixture was heated at 120° C. for 48 h. Then it was poured into distilled water. The organic layer was extracted with ethyl acetate 3 times and dried over magnesium sulfate. It was filtered and the filtrate was concentrated on a rotary evaporator afford 13.3 g (96%) of golden yellow crystals. m.p. 205.0-206.6° C. FT-IR (cm$^1$): 3071, 1612, 1585, 1523, 1487, 1345, 1242, 1176, 1116, 879, 866, 831, 788, 696, 556. Anal. Calcd. for C$_{36}$H$_{24}$N$_3$O$_{10}$P: C, 62.70%; H, 3.51%; N, 6.09%; P, 4.49%; Found: C, 62.63%; H, 3.50%; N, 6.06%; P, 4.40%. Mass Spectrum (m/e): 689 (M$^+$). $^1$H-NMR (DMSO-d$_6$, δ in ppm): 7.27-7.31 (d, 6H, Ar—H), 7.35-7.37 (d, 6H, Ar—H), 7.75-7.80 (d, 6H, Ar—H), 8.27-8.31 (d, 6H, Ar—H). $^{13}$C-NMR (DMSO-d$_6$, δ in ppm): 118.84, 119.82, 119.94, 126.22, 128.18, 129.23, 134.09, 134.20, 143.09, 157.93, 157.96, 161.29.

(d) Tris[4-(4-aminophenoxy)phenyl]phosphine Oxide. Tris [4-(4-nitrophenoxy)phenyl]phosphine Oxide (8.0 g, 11.6 mmol), DMF (120 mL) and 5% palladium on activated carbon (0.50 g) were added to a hydrogenation bottle. The bottle was secured on a Parr hydrogenation apparatus, flushed three times with hydrogen, and then pressurized to 60 psi. After the mixture was agitated at room temperature for 24 h under the hydrogen pressure of 60 psi, it was filtered through Celite. The filter cake was washed with DMF, and then the filtrate was poured into water. The precipitate was collected and recrystallized from ethanol/water to afford 6.40 g (99%) of white crystals. m.p. 211.1-211.5° C. MS (m/e): 599 (M$^+$). Anal. Calcd. for C$_{36}$H$_{30}$N$_3$O$_4$P: C, 72.11%; H, 5.04%; N, 7.01%. Found: C, 72.01%; H, 4.97%; N, 6.91%. FT-IR (KBr, cm$^{-1}$): 3437, 3328 (NH$_2$), 3210, 3042, 1592, 1507, 1493, 1243, 1197, 1165, 1117, 871, 830, 671, 577. $^1$H-NMR (DMSO-d$_6$, δ in ppm): 5.06 (s, 6H, NH$_2$), 6.59-6.62 (d, 6H, Ar—H), 6.79-6.81 (d, 6H, Ar—H), 6.94-6.96 (dd, 6H, Ar—H), 7.48-7.53 (dd, 6H, Ar—H). $^{13}$C-NMR (DMSO-d$_6$, δ in ppm): 114.85, 115.89, 116.01, 121.34, 125.06, 126.13, 133.40, 133.51, 144.11, 146.13, 161.89, 161.92.

(e) Tris[4-(3,4-dicyanophenoxy)phenyl]phosphine Oxide. Into a 500 mL 3-neck round bottom flask equipped with stir bar, condenser, and nitrogen inlet were charged tris(4-hydroxyphenyl)phosphine oxide (8.13 g, 25.0 mmol), 4-nitrophthalonitrile (13.0 g, 75.0 mmol), K$_2$CO$_3$ (11.5 g, 85.5 mmol), and DMF (150 mL). The mixture was heated at 50° C. for 24 h. Then it was poured into distilled water. The organic layer was extracted with ethyl acetate 3 times and dried over magnesium sulfate. It was filtered and the filtrate was dried on a rotary evaporator afford 15.8 g (81%) of a yellow powder. m.p. 205.0-206.6° C. m.p. 127.6-132.8° C. It was purified by slurred in ethyl acetate. m.p. 138.1-139.4° C. Anal. Calcd. for C$_{42}$H$_{21}$N$_6$O$_4$P: C, 71.59%; H, 3.00%; N, 11.93%. Found: C, 71.41%; H, 2.99%; N, 11.59%. $^1$H-NMR (DMSO-d$_6$, δ in ppm): 7.33-7.35 (dd, 6H, Ar—H), 7.54-7.57 (dd, 3H, Ar—H), 7.73-7.78 (dd, 6H, Ar—H), 7.95-7.96 (d, 3H, Ar—H) 8.14-8.16 (d, 3H, Ar—H). $^{13}$C-NMR (DMSO-d$_6$, δ in ppm): 109.40, 115.28, 115.77, 116.87, 119.78, 119.90, 128.47, 129.53, 134.19, 134.30, 136.30, 136.40, 157.41, 157.44, 159.59.

(f) Tris[4-(3,4-dicarboxyphenoxy)phenyl]phosphine Oxide. Into a 250 mL 3-neck round bottom flask equipped with stir bar, condenser, and nitrogen inlet were charged tris[4-(3,4-dicyanophenoxy)phenyl]phosphine oxide (2.5 g, 3.2 mmol), KOH (2.7 g, 48 mmol), and ethanol/water (1:1, 60 mL). The mixture was heated under reflux for 12 h until it formed a clear solution. It was allowed to cool to room temperature and neutralized with conc. HCl solution to pH 1-3. The white precipitate was collected and dried in oven to afford 2.60 g (99%) of white crystals. m.p.>300° C. $^1$H-NMR (DMSO-d$_6$, δ in ppm): 7.22-7.27 (m, 12H, Ar—H), 7.67-7.72 (dd, 6H, Ar—H), 7.76-7.78 (d, 3H, Ar—H). $^{13}$C-NMR (DMSO-d$_6$, δ in ppm): 118.35, 118.90, 119.02, 120.51, 127.35, 127.40, 128.46, 131.40, 134.02, 134.13, 136.46, 157.46, 158.83, 158.86, 167.52, 168.21.

(g) Tris[4-(3,4-dicarboxyphenoxy)phenyl]phosphine Oxide trianhydride. Into a 100 mL 3-neck round bottom flask equipped with stir bar, condenser, and nitrogen inlet were charged tris[4-(3,4-dicarboxyphenoxy)phenyl]phosphine oxide (2.0 g, 2.44 mmol), acetic acid (7 mL), and acetic anhydride (15 mL). The mixture was refluxed for 4 h until it formed a clear solution, which was then filtered while hot to remove insoluble impurities. After cooling to room temperature, the crystallized solid was collected, washed with dry toluene, and dried under vacuum to afford 1.4 g (75%) of golden yellow crystals. m.p. 151.8-152.1° C. Anal. Calcd. for C$_{42}$H$_{21}$O$_{13}$P: C, 65.98%; H, 2.77%; N, 0%; P, 4.05%. Found: C, 65.34%; H, 2.91%; N, <0.1%; P, 3.94. $^1$H-NMR (DMSO-d$_6$, δ in ppm): 7.34-7.36 (dd, 6H, Ar—H), 7.62-7.65 (dd, 3H, Ar—H), 7.66-7.68 (dd, 3H, Ar—H), 7.77-7.82 (dd, 6H, Ar—H), 8.01-8.12 (d, 3H, Ar—H. $^{13}$C-NMR (DMSO-d$_6$, δ in ppm): 114.48, 119.75, 119.88, 125.95, 125.98, 127.94, 128.39, 129.44, 134.18, 134.26, 134.37, 157.92, 157.95, 162.29, 162.40, 162.47.

Example 12 Synthesis/Characterization of trianhydride-crosslinked polyimides (2 mol % trianhydride, xCP2-An2 APB (1.169 g, 4.000 mmol) and DMAc (15 mL) were added to a 50 mL, 3-necked flask equipped with a magnetic stirrer, nitrogen inlet and outlets, and the resulting mixture was stirred under dry nitrogen at room temperature for 30 min. 6FDA (1.724, 3.880 mmol) was then charged. The light yellow solution was agitated at room temperature for 24 hr to afford a poly(amic acid) solution. Then, the trianhydride crosslinker (0.0612 g, 0.080 mmol) was added to this solution. After the triamine had completely dissolved in DMAc, the mixture poured into a glass dish, followed by vacuum evaporation of DMAc at 50° C., and heat-treated at: 100° C./1 h, 150° C./1 h, 175° C./1 h, 200° C./1 h, 250° C./1 h and 300° C./1 h to form crosslinked polyimide films. The film thickness was approximately 20-100 μm. This procedure was followed to prepare other PAn-CP2-x (x stands for percentage of trianhydride crosslinker.

Example 13 Synthesis/Characterization of phosphine-oxide-trianhydride-crosslinked polyimides derived from 2PE-ODA and an anhydride (PE100-xPI-An2) as illustrated by the synthesis of 2 mol % phosphine-oxide-trianhydride crosslinked polyimides derived 2PE-oODA and oxy-4,4'-diphthalic anhydride (ODPA).

2PE-ODA (0.4806, 1.200 mmol) and DMAc (5.0 g) were added to a 50 mL 3-necked flask equipped with a magnetic stirrer, nitrogen inlet and outlets, and the resulting mixture was stirred under dry nitrogen at room temperature for 30 min. OPDA (0.3611, 1.164 mmol) was then added to the resulting solution. The light yellow solution was agitated at room temperature overnight to afford a poly(amic acid) solution. Then, POTAn trianhydride (0.0183 g, 0.024 mmol) was added to this solution. After POTAn had completely dissolved in DMAc, the mixture was poured into a glass petri dish, followed by vacuum evaporation of DMAc at 50° C., and heat-treated according to following schedule: 100° C./1 hr, 150° C./1 hr, 175° C./1 hr, 200° C./1 hr and 250° C./1 hr to form polyimide films. The film thickness was approximately 50-150 µm. ATR-IR (cm$^{-1}$): 3063, 2214 (C≡C), 1779, 1718, 1606, 1496, 1473, 1441, 1416, 1374, 1306, 1260, 1233, 1196, 1082, 937, 835, 808, 741, 688, 616, 597, 562, 536, 467.

Example 14. Representative procedure for the synthesis of phosphine-oxide trianhydride crosslinked co-polyimides using 2PE40-xCP2-An2 as example APB (0.7014 g, 2.400 mmol), 2PE-ODA (0.6408 g, 1.600 mmol) and DMAc (10 g) were added to a 50 mL 3-necked flask equipped with a magnetic stirrer, nitrogen inlet and outlets, and the resulting mixture was stirred under dry nitrogen at room temperature for 30 min. 6FDA (1.7503, 3.880 mmol) was then added to the resulting solution. The light yellow solution was agitated at room temperature overnight to afford a poly(amic acid) solution. Then, POTAn trianhydride (0.0612 g, 0.080 mmol) was added to this solution. After POTAn had completely dissolved in DMAc, the mixture was poured into a glass petri dish, followed by vacuum evaporation of DMAc at 50° C., and heat-treated according to following schedule: 100° C./1 hr, 150° C./1 hr, 175° C./1 hr, 200° C./1 hr and 250° C./1 hr to form polyimide films. The film thickness was approximately 50-150 µm. ATR-IR (cm$^{-1}$): 3081, 2214 (C≡C), 1784, 1720 (C=O), 1585, 1477, 1440, 1418, 1369, 1299, 1236, 1188, 1141, 1095, 962, 844, 756, 718, 687, 627, 595, 568, 527, 452.

While the present invention has been illustrated by the description of one or more embodiments thereof, and while the embodiments have been described in considerable detail, they are not intended to restrict or in any way limit the scope of the appended claim to such detail. Additional advantages and modification will be readily apparent to those skilled in the art. The invention in its broader aspects is therefore not limited to the specific details, representative apparatus and methods and illustrative examples shown and described. Accordingly, departures may be made from such details without departing from the scope or the spirit of the general inventive concept exemplified herein.

What is claimed is:

1. A method for fabricating a shape memory polymer into a three-dimensional object, comprising:
    a) treating a solution comprising:
        (i) a polymeric intermediate comprising repeat units and non-terminal, phenylethynyl moieties, each of said repeat units independently comprising 0 to 4 of said non-terminal, phenylethynyl moieties per repeat unit with the proviso that not all of said repeat units comprise only 0 or only 1 of said non-terminal, phenylethynyl moieties, said polymeric intermediate being selected from the group consisting of a poly (amic acid) intermediate, a poly(amide-amic acid) intermediate, a copolymer intermediate of poly(amic acid) and poly(amide-amic acid) and mixtures thereof;
        (ii) a solvent;
    with a multi-functional crosslinking agent to thereby form a sol-gel comprising a crosslinked poly(amic acid), a crosslinked poly(amide-amic acid) and/or a crosslinked copolymer of poly(amic acid) and poly (amide-amic acid), said crosslinked poly(amic acid), a crosslinked poly(amide-amic acid) and/or a cross-linked copolymer of poly(amic acid) and poly (amide-amic acid) comprising said non-terminal, phenylethynyl moieties, said multi-functional cross-linking agent comprising at least a tri-functionalized amine crosslinking agent when said polymeric intermediate is anhydride end-functionalized and said multi-functional crosslinking agent comprising at least a tri-functionalized anhydride crosslinking agent when said polymeric intermediate is amine end-functionalized;
    b) forming a film of said sol-gel on a substrate to provide a laminated substrate;
    c) evaporating at least a portion of the solvent from the sol-gel by heating the sol-gel comprising to a temperature in a range of about 50° C. to about 100° C. at a pressure less than about atmospheric pressure;
    d) forming the laminated substrate into a first configuration that is in a three-dimensional form;
    e) imidizing, via heating, said sol-gel to provide the shape memory polymer having a permanent shape corresponding to the first configuration, wherein the shape memory polymer comprises a crosslinked polyimide, a crosslinked poly(amide-imide) and/or a crosslinked polyimide poly(amide-imide) copolymer; and
    f) removing the substrate from the laminated substrate to provide the three-dimensional object comprising the shape memory polymer, preferably said removal comprises chemically removing the substrate from the laminated substrate
    g) optionally, heating said shape memory polymer to a temperature of from about 210° C. to 250° C. and then placing said shape memory polymer under tension to a new shape.

2. A method for fabricating a shape memory polymer into a three-dimensional object according to claim 1 comprising crosslinking said non-terminal, phenylethynyl moieties by heating said substrate to a temperature of from greater than 250° C. to about 400° C.

3. The method of claim 1, wherein the substrate comprises a metal that dissolves in an aqueous acid solution, preferably said metal comprises aluminum.

4. The method of claim 1, wherein the multi-functional anhydride crosslinking agent has the following chemical formula:

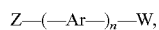

wherein Z represents an anhydride functional group that is directly or indirectly bonded to Ar; Ar represents an aryl group that is directly bonded to W; and n is equal to 3 when W is P=O or N, or n is equal to 4 when W is Si or a carbon moiety.

5. The method of claim 4, wherein Ar is a phenyleneoxy group (—OPh-) that is para- or meta-substituted with respect to oxygen, and the multi-functional anhydride crosslinking agent has the following chemical formula:

Z—(—OPh-)$_n$—W.

6. The method of claim 4, wherein Z and Ar in combination form a phthalic anhydride moiety that is directly bonded to W.

7. The method of claim 4, wherein Ar is a phenyleneoxy group (—OPh-) that is para- or meta-substituted with respect to oxygen, and wherein Z is a phthalic anhydride group that is connected to the phenyleneoxy group through an ether bond.

8. The method of claim 4, wherein W is P=O, wherein Ar is a phenyleneoxy group (—OPh-) that is para- or meta-substituted with respect to oxygen, and wherein the multi-functional anhydride crosslinking agent has the following chemical formula:

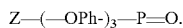
Z—(—OPh-)$_3$—P=O.

9. The method of claim 8, wherein Z is a phthalic anhydride group that is connected to the phenyleneoxy group through an ether bond, and wherein the multi-functional anhydride crosslinking agent has the following chemical formula:

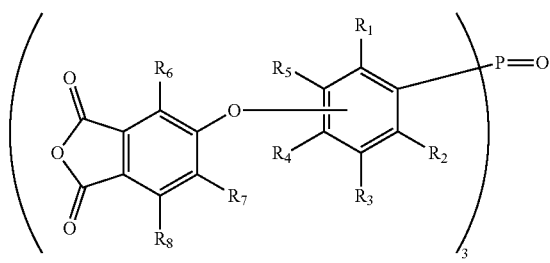

wherein $R_1$ through $R_8$ are each independently selected from H or $C_1$-$C_4$ alkyl.

10. The method of claim 9, wherein the multi-functional anhydride crosslinking agent is selected from tris[3-(3,4-dicarboxyphenoxy)phenyl]phosphine oxide trianhydride or tris[4-(3,4-dicarboxyphenoxy)phenyl]phosphine oxide trianhydride.

11. The method of claim 4, wherein W is N, wherein Ar is a phenyleneoxy group (—OPh-) that is para- or meta-substituted with respect to oxygen, and wherein the multi-functional anhydride crosslinking agent has the following chemical formula:

Z—(—OPh-)$_3$—N.

12. The method of claim 11, wherein Z is a phthalic anhydride group that is connected to the phenyleneoxy group through an ether bond, and wherein the multi-functional anhydride crosslinking agent has the following chemical formula:

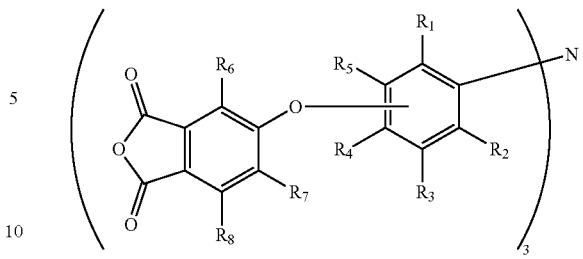

wherein $R_1$ through $R_8$ are each independently selected from H or $C_1$-$C_4$ alkyl.

13. The method of claim 11, wherein the multi-functional anhydride crosslinking agent is selected from tris[3-(3,4-dicarboxyphenoxy)phenyl]amine trianhydride or tris[4-(3,4-dicarboxyphenoxy)phenyl]amine trianhydride.

14. The method of claim 4, wherein W is N, wherein Z and Ar in combination form a phthalic anhydride moiety that is directly bonded to N, and wherein the multi-functional anhydride crosslinking agent has the following chemical formula:

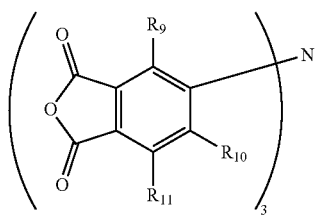

wherein $R_9$ to $R_{11}$ are each independently selected from H or $C_1$-$C_4$ alkyl.

15. The method of claim 1, wherein the multi-functional amine crosslinking agent comprises a tri(oxybenzene-amine) crosslinker having following chemical formula:

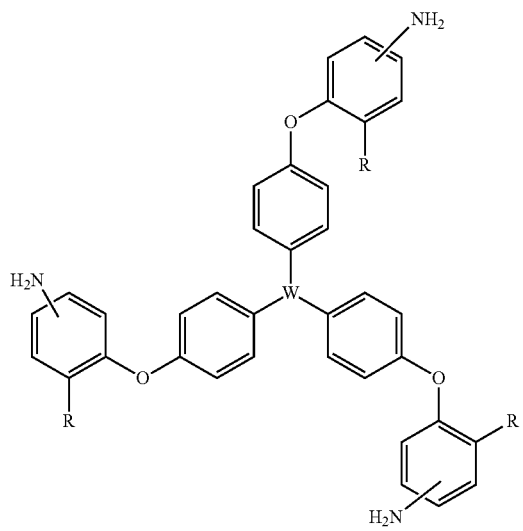

wherein W is selected from a group consisting of $CH_3C$, N, P=O, or $BO_3$; R is selected from a group consisting of H, F, Cl, $CF_3$, or $CH_3$; and the amine groups are located meta or para with respect to R.

* * * * *